(12) United States Patent
Kim et al.

(10) Patent No.: US 7,367,677 B2
(45) Date of Patent: May 6, 2008

(54) HIGH EFFICIENCY LIGHTING SYSTEM, SCROLLING UNIT AND PROJECTION SYSTEM EMPLOYING THE SAME

(75) Inventors: Dae-Sik Kim, Suwon-si (KR); Yung-Jun Park, Yongin-si (KR); Kun-Ho Cho, Suwon-si (KR); Hee-Joong Lee, Anyang-si (KR); Chong-Sam Chung, Hwaseong-gun (KR); Jong-Chul Choi, Suwon-si (KR); Tae-Hee Kim, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 80 days.

(21) Appl. No.: 10/510,281

(22) PCT Filed: Apr. 4, 2003

(86) PCT No.: PCT/KR03/00679

§ 371 (c)(1),
(2), (4) Date: Oct. 19, 2005

(87) PCT Pub. No.: WO03/087930

PCT Pub. Date: Oct. 23, 2003

(65) Prior Publication Data

US 2006/0087619 A1   Apr. 27, 2006

(30) Foreign Application Priority Data

Apr. 6, 2002  (KR) ............... 10-2002-0018802
Jul. 11, 2002  (KR) ............... 10-2002-0040399

(51) Int. Cl.
*G03B 21/14*  (2006.01)

(52) U.S. Cl. ............... 353/31; 353/38

(58) Field of Classification Search ............... 353/20, 353/31, 33, 34, 37, 38; 349/5, 7, 8, 9; 348/742, 348/743, 771
See application file for complete search history.

(56) References Cited

U.S. PATENT DOCUMENTS 6,227,682 B1   5/2001   Li (Continued)

FOREIGN PATENT DOCUMENTS

EP   1 070 984 A1   1/2001

(Continued)

*Primary Examiner*—William C. Dowling
(74) *Attorney, Agent, or Firm*—Sughrue Mion, PLLC

(57) ABSTRACT

A highly efficient lighting system, a scrolling unit, and a projection system adopting the highly efficient lighting system and the scrolling unit are provided. The scrolling unit has at least one lens cell. From the viewpoint of light incident upon the at least one lens cell, the rotation of the at least one lens cell is converted into a rectilinear motion of a lens array, such that incident light is scrolled. The projection system includes a light source, an optical splitter, at least one scrolling unit, and a light valve. The optical splitter splits light emitted from the light source according to wavelength. The at least one scrolling unit has at least one lens cell. The lens cell has an incident side and an emitting side and divides incident light into light beams. The rotation of the lens cell causes a rectilinear motion of the light beams, thereby scrolling incident light. The light emitted from the light source is separated into color beams by the optical splitter and the scrolling unit, and the color beams are focused on the light valve. The light valve processes incident light according to an input image signal in order to form a color image.

31 Claims, 24 Drawing Sheets

U.S. PATENT DOCUMENTS

| | | | |
|---|---|---|---|
| 6,288,815 B1 * | 9/2001 | Lambert | 359/196 |
| 6,332,684 B1 * | 12/2001 | Shibatani et al. | 353/31 |
| 6,591,022 B2 * | 7/2003 | Dewald | 382/274 |
| 6,877,860 B2 * | 4/2005 | Cho et al. | 353/31 |
| 6,997,562 B2 | 2/2006 | Cho | |
| 7,066,602 B2 * | 6/2006 | Lee et al. | 353/31 |
| 7,097,308 B2 * | 8/2006 | Kim et al. | 353/31 |
| 7,104,651 B2 * | 9/2006 | Kim et al. | 353/31 |
| 7,150,532 B2 * | 12/2006 | Kim et al. | 353/20 |
| 7,163,293 B2 * | 1/2007 | Kim et al. | 353/31 |
| 7,175,280 B2 * | 2/2007 | Kim et al. | 353/31 |
| 7,210,187 B2 * | 5/2007 | Kim et al. | 353/33 |
| 7,226,169 B2 * | 6/2007 | Kim et al. | 353/33 |
| 2003/0095213 A1 * | 5/2003 | Kanayama et al. | 348/742 |

FOREIGN PATENT DOCUMENTS

| | | |
|---|---|---|
| JP | 04-226443 | 8/1992 |
| JP | 06-051402 | 2/1994 |
| JP | 08-510842 | 11/1996 |
| JP | 1996-292506 A | 11/1996 |
| JP | 9-214997 A | 8/1997 |
| JP | 1999-212051 A | 8/1999 |
| JP | 2001-5097 A | 1/2001 |
| JP | 2001-042433 | 2/2001 |
| JP | 2001-051231 | 2/2001 |
| JP | 2001-174913 | 6/2001 |
| JP | 2001-183605 | 7/2001 |
| JP | 2001-324760 A | 11/2001 |
| JP | 2002-541512 | 12/2002 |
| JP | 2005-513566 A | 5/2005 |
| KR | 2002-4766 A | 1/2002 |
| WO | WO 94/28672 | 12/1994 |
| WO | WO 00/60397 | 10/2000 |
| WO | WO 01/27962 A2 | 4/2001 |
| WO | WO 01/71405 A2 | 9/2001 |
| WO | WO 03/055231 A1 | 7/2003 |

* cited by examiner

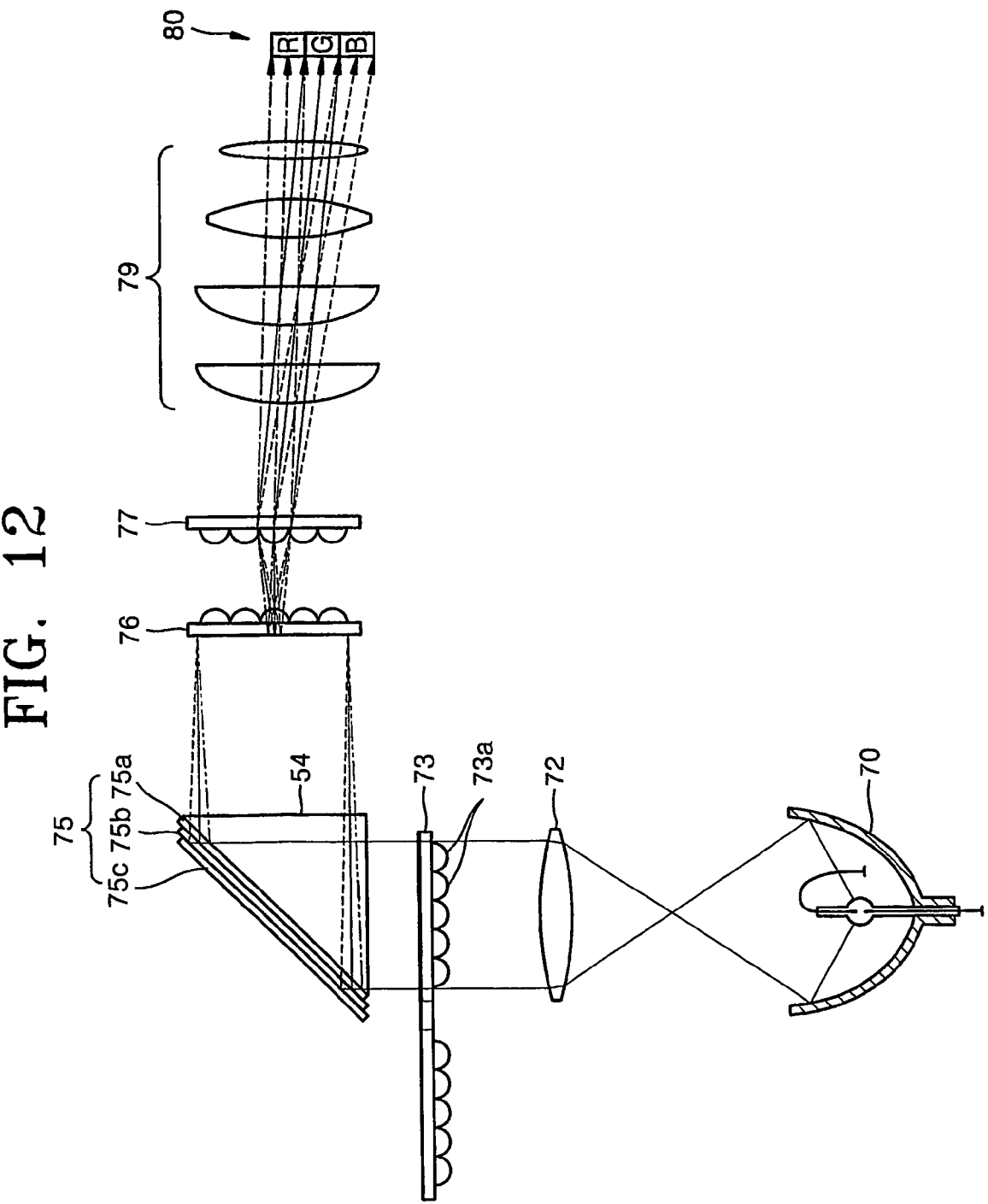

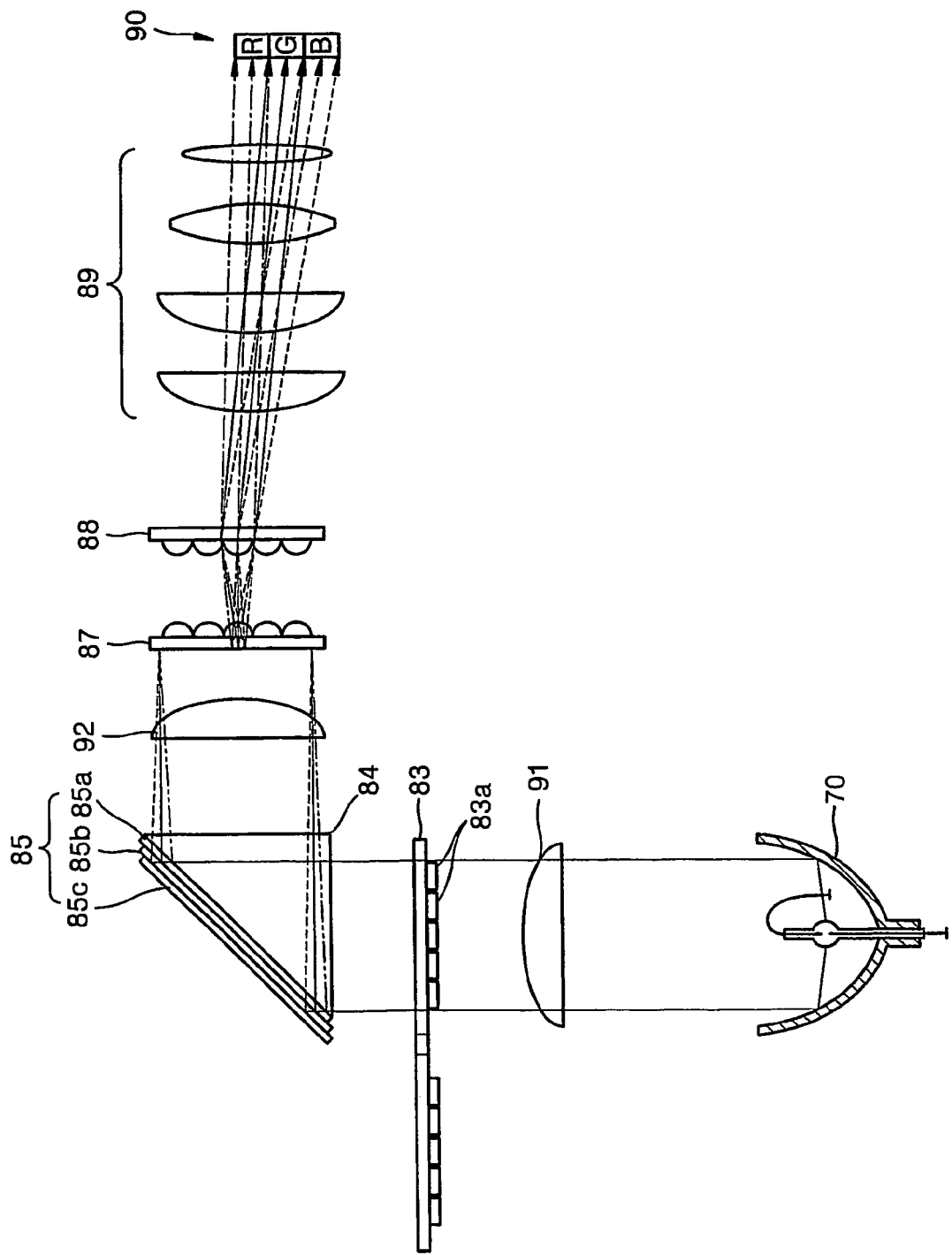

m-ORDER DIFFRACTED BEAM

−FIRST-ORDER BEAM

+FIRST-ORDER BEAM

IMAGE SURFACE

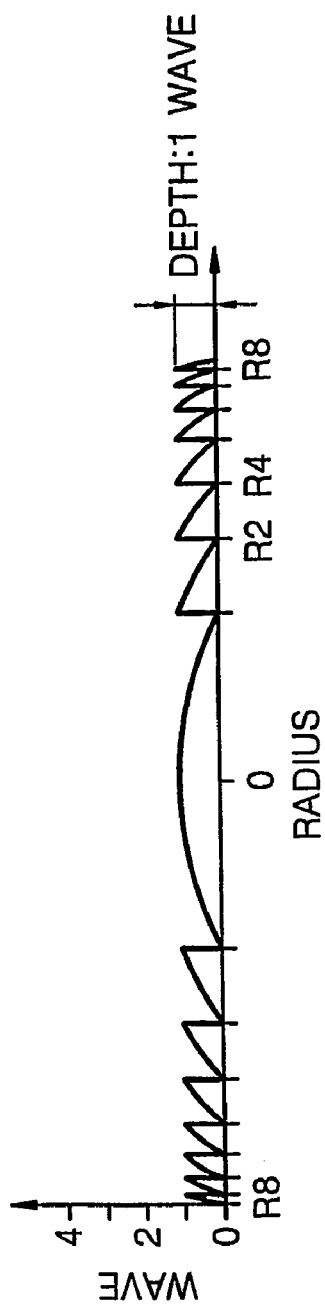
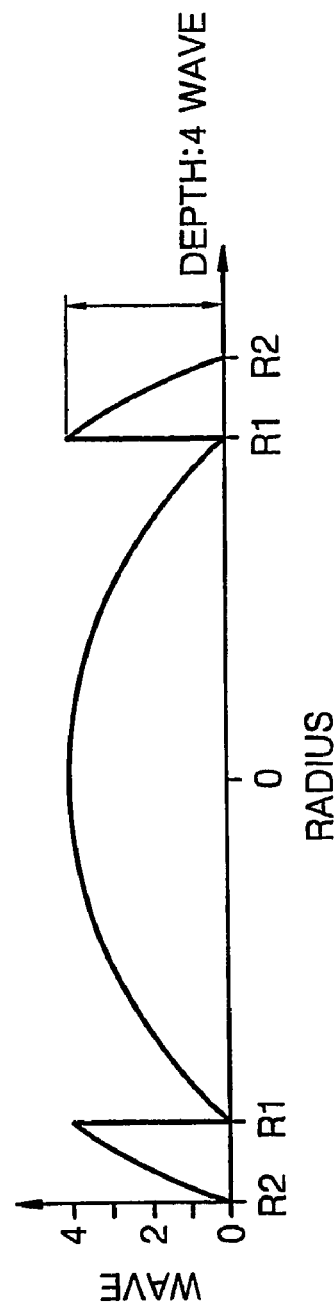

HIGH EFFICIENCY LIGHTING SYSTEM, SCROLLING UNIT AND PROJECTION SYSTEM EMPLOYING THE SAME

TECHNICAL FIELD

The present invention relates to a highly efficient lighting system, a scrolling unit for scrolling incident light, and a projection system employing the highly efficient lighting system and the scrolling unit, and more particularly, to a highly efficient lighting system which increases a light efficiency and reduces etendue of a light source to be made compact in a single-panel structure, a scrolling unit which performs scrolling in an improved way, and a projection system employing the highly efficient lighting system and the scrolling unit.

BACKGROUND ART

Projection systems are classified into three-panel projection systems and single panel projection systems according to the number of light valves which form an image by controlling the on/off operation of light emitted from a high power lamp used as a light source on a pixel-by-pixel basis. The single panel projection system may have an optical system smaller than that of the three-panel projection system in size. However, since the single panel projection system splits white light sequentially into three light beams of red (R), green (G), and blue (B) colors, a light efficiency of the single panel projection system decreases to ⅓ of that of the three panel type projection system. Thus, attempts to increase the light efficiency of the single panel projection system have been made.

A conventional single panel projection system is disclosed in U.S. Application No. 2002/191154 A1. As shown in FIG. 1, in the disclosed conventional single panel projection system, white light emitted from a light source 100 passes through first and second lens arrays 102 and 104 and a polarized light beam splitter array 105, and is then split into R, G, and B color light beams by first, second, third, and fourth dichroic filters 109, 112, 122, and 139. R and G color light beams are transmitted through the first dichroic filter 109 and proceed along a first optical path I1, and a B color light beam is reflected by the first dichroic filter 109 and proceeds along a second optical path I2 to be reflected by a mirror 133. The R and G color light beams proceeding along the first optical path I1 are separated from each other by the second dichroic filter 112. In other words, the R color light beam is transmitted through the second dichroic filter 112 and proceeds along the first optical path I1 to be reflected by another mirror 138, and the G color light beam is reflected by the second dichroic filter 112 and proceeds along a third optical path I3.

As described above, the white light emitted from the light source 100 is split into the R, G, and B color light beams, and the R, G, and B color light beams are scrolled to pass through first, second, and third prisms 114, 135, and 142 respectively corresponding to the R, G, and B color light beams. The first, second, and third prisms 114, 135, and 142 are arranged on the first, second, and third optical paths I1, I2, and I3, respectively, and rotated at a uniform speed so that R, G, and B color bars are scrolled. The G and B color light beams proceeding along the second and third optical paths I2 and I3 are reflected by and transmitted through the third dichroic filter 139 so that the G and B color light beams are combined. Finally, the R, G, and B color light beams are combined by the fourth dichroic filter 122 and pass through the polarized light beam splitter 127, and a light valve 130 forms an image using the R, G, and B color light beams. Here, reference numeral 125 denotes a polarizer, and reference numerals 118 and 133 denote light path conversion units.

FIG. 2 illustrates a process of scrolling R, G, and B color bars due to rotations of the first, second, and third prisms 114, 135, and 142. Here, the R, G, and B color bars formed on a surface of the light valve 130 periodically move when the first, second, and third prisms 114, 135, and 142 corresponding to the R, G, and B color light beams are rotated at the same time and at the same speed. For example, if R, G, and B color bars are formed on the light valve 130, one frame of color image is produced when the R, G, and B color bars rotate one round as shown in FIG. 2.

The light valve 130 forms a color image by processing its individual pixels according to an on-off signal. A projection lens (not shown) magnifies and projects the color image onto a screen.

In the above-mentioned method, since an optical path has to be used for each of three color light beams, a lens for each of the three color light beams is required, and parts for condensing split light beams are necessary. Thus, a volume of the single panel projection system is increased, assembly thereof is difficult, and optical paths are complicated to cause a difficulty in arranging an optical axis. Also, etendue of the light beams is increased during a process of splitting light into the three color light beams and condensing the three color light beams. Here, the etendue E refers to an optical conservative physical quantity in an optical system and is expressed as in Equation 1.

$$E = \pi A \sin^2\left(\theta_{\frac{1}{2}}\right) = \frac{\pi A}{(4 Fno)^2} \quad (1)$$

wherein A denotes an area of an object, the etendue of which is to be measured, and Fno denotes F numbers of lenses. In Equation 1, the etendue depends on the area and F number of the object and refers to a physical quantity expressed by a geometrical structure of the optical system. The etendue at a starting point of the optical system should be identical to the etendue at an ending point of the optical system, so that the light efficiency is optimized. For example, if the etendue at the ending point of the optical system is greater than the etendue at the starting point, the volume of the optical system is increased. If the etendue at the ending point is less than the etendue at the starting point, light may be lost. If the etendue of the light source is great, angles of the light beams incident onto a subsequent lens are widened. Thus, it is difficult to constitute the optical system satisfying these requirements.

However, the optical system may be easily constituted while reducing the etendue.

However, in a single panel scrolling projection display device, a light beam is split into three color light beams and then condensed. Due to this, a divergence angle becomes bigger, and thus the etendue is increased. Thus, constituting an optical system becomes difficult due to an increase in the etendue.

Also, in a general single panel projection optical system, white light is split into R, G, and B color light beams, which are sequentially forwarded to a light valve by a filter. The light valve operates according to the order of R, G, and B color light beams to form a color image. As described above, since the single panel projection optical system sequentially uses the R, G, and B color light beams, the light efficiency decreases to ⅓ of that of the three panel optical system. In order to solve these problems, a color scrolling method was suggested. In the color scrolling method, after the white light is split into the R, G, and B color light beams, the R, G, and B color light beams are forwarded to different positions of the light valve at the same time. All of the R, G, and B color light beams have to reach one pixel to realize a color image.

Thus, each of the R, G, and B color light beams is moved at a uniform speed using a specific method.

In the conventional single panel projection optical system, when prisms are rotated for scrolling, an independent prism is used for each of color light beams. However, it is difficult to match respective driving velocity of the prisms and the light valves, and the velocity for scrolling the color light beams may not be uniform due to circular movements of the prisms. Since a separate part is necessary for each of the color light beams, the volume of the optical system is increased, and processes of manufacturing and assembling the optical system are complicated. As a result, yield of the optical system decreases.

DISCLOSURE OF THE INVENTION

The present invention provides a lighting system which reduces the etendue of a light source to achieve an easy manufacture of an optical system, to obtain a compact optical system, and to increase light efficiency, and a projection system adopting the lighting system.

The present invention also provides a scrolling unit by which all color bars can be scrolled.

The present invention also provides a compact single-panel projection system which has an improved light efficiency by adopting a scrolling unit.

According to an aspect of the present invention, there is provided a lighting system including a bulb radiating light, a reflection mirror that reflects the light emitted from the bulb and has an opening toward which the reflected light is emitted, and at least one reflection unit covering a portion of the opening of the reflection mirror.

The reflection mirror can be either an elliptic mirror or a parabolic mirror.

According to an aspect of the present invention, there is provided another lighting system including a bulb radiating light; a reflection mirror that reflects the light emitted from the bulb; and a reflection unit installed on a portion of a surface of the bulb.

Preferably, the reflection unit is installed on a portion of a hemispherical surface of the bulb facing the reflection mirror.

According to another aspect of the present invention, there is provided a projection system forming an image by processing light emitted from a lighting system according to an input image signal using a light valve, magnifying the image, and projecting the image onto a screen using a projection scrolling unit. Here, the lighting system includes a bulb generating light; a reflection mirror that reflects the light emitted from the bulb and has an opening toward which the reflected light is emitted from the bulb; and at least one reflection unit covering a portion of the opening of the reflection mirror.

According to another aspect of the present invention, there is provided another projection system forming an image by processing light emitted from a lighting system according to an input image signal using a light valve, magnifying the image, and projecting the image onto a screen using a projection scrolling unit. Here, the lighting system includes: a bulb generating light; a reflection mirror that reflects the light emitted from the bulb; and a reflection unit installed on a portion of a surface of the bulb.

According to still another aspect of the present invention, there is provided a scrolling unit for scrolling incident unit. The scrolling unit includes a rotation axis and at least one lens cell. The lens cell has an incident side and an emitting side, divides incident light into light beams of individual lens cells, and makes the rotation of the scrolling unit cause a rectilinear motion of the light beams.

The rectilinear motion of the light beams is made in the direction where the light beams become closer to or farther from the rotation axis.

The rotation of the scrolling unit causes the rectilinear motion of the light beams to be periodically repeated.

Preferably, the lens cells are spirally arranged and are cylindrical lenses.

According to still another aspect of the present invention, there is provided another scrolling unit having at least one lens cell. In the scrolling unit, from the viewpoint of light incident upon the at least one lens cell, the rotation of the at least one lens cell is converted into a rectilinear motion of a lens array, such that incident light is scrolled.

The lens cells are formed of any of a diffractive optical element and a hologram optical element such that incident light is divided according to color.

The lens cells are arranged so that, when a normal line is drawn to the lens cells, the interval between adjacent lens cells is uniform, and the normal vectors of adjacent lens cells are the same.

A spiral track $(Q_{kx}, Q_{ky})$ of the lens cell satisfies the following Equation:

$$Q_{kx} = Q_{1,x} \cos(k-1)\theta_2 - Q_{1,y} \sin(k-1)\theta_2$$

$$Q_{ky} = Q_{1,y} \sin(k-1)\theta_2 - Q_{1,y} \cos(k-1)\theta_2$$

wherein $Q_{1,x}$ and $Q_{1,y}$ denote the x and y coordinates of a first cylinder lens cell, respectively, k denotes a natural number, and $\theta_2$ denotes a rotation angle between adjacent curves.

According to still another aspect of the present invention, there is provided still another scrolling unit for scrolling incident light, in which at least one lens cell is included, and from the viewpoint of incident light, the position of the at least one lens cell changes as the scrolling unit rotates around a rotation axis.

According to still yet another aspect of the present invention, there is provided a compact single-panel projection system including a light source, an optical splitter, at least one scrolling unit, and a light valve. The optical splitter splits light emitted from the light source according to wavelength. The at least one scrolling unit has at least one lens cell. In the scrolling unit, it appears to light transmitted by the lens cell that the rotation of the lens cell is converted into a rectilinear motion of a lens array, such that incident light is scrolled. The light emitted from the light source is separated into color beams by the optical splitter and the scrolling unit, and the color beams are focused on the light valve. The light valve processes incident light according to an input image signal in order to form a color image.

Preferably, at least one fly eye lens array is installed on a light path between the scrolling unit and the light valve.

A relay lens for focusing the light transmitted by the at least one fly eye lens array on the light valve is included.

The optical splitter includes first through third dichroic filters adjacently disposed at different angles to selectively transmit or reflect the incident light according to wavelength, and the scrolling unit is installed behind the optical splitter.

The optical splitter includes first through third dichroic filters disposed in parallel to selectively transmit or reflect the incident light according to wavelength, and the scrolling unit is installed before the optical splitter.

Preferably, a first cylinder lens is installed before the at least one scrolling unit, and a second cylinder lens paired with the first cylinder lens is installed behind the scrolling unit, in order to control the width of an incident beam.

The number of lens cells on the at least one scrolling unit is determined so that the scrolling unit can operate in synchronization with the operating frequency of the light valve.

According to still yet another aspect of the present invention, there is provided another compact single-panel projection system including a light source, at least one scrolling unit, and a light valve. The at least one scrolling unit has at least one cell and is manufactured of any of a diffractive optical element and a hologram optical element so that light emitted from the light source is separated according to wavelength and incident light is scrolled by converting the rotation of the cell into the rectilinear motion of a cell array. The light emitted from the light source is separated into color beams by the optical splitter and the scrolling unit, and the color beams are focused on the light valve. The light valve processes incident light according to an input image signal to form a color image.

According to still yet another aspect of the present invention, there is provided another compact single-panel projection system including a light source, an optical splitter, at least one scrolling unit, and a light valve. The optical splitter splits light emitted from the light source according to wavelength. The at least one scrolling unit has at least one lens cell. The lens cell has an incident side and an emitting side and divides incident light into light beams. The rotation of the lens cell causes a rectilinear motion of the light beams to achieve scrolling of incident light. The light emitted from the light source is separated into color beams by the optical splitter and the scrolling unit, and the color beams are focused on the light valve. The light valve processes incident light according to an input image signal in order to form a color image.

According to still yet another aspect of the present invention, there is provided still another compact single-panel projection system, which includes a light source, an optical splitter, at least one scrolling unit, and a light valve. The optical splitter splits light emitted from the light source according to wavelength. The at least one scrolling unit has at least one lens cell. From the viewpoint of incident light, the position of the at least one lens cell changes as the scrolling unit rotates around a rotation axis. The light emitted from the light source is separated into color beams by the optical splitter and the scrolling unit, and the color beams are focused on the light valve. The light valve processes incident light according to an input image signal in order to form a color image.

BRIEF DESCRIPTION OF THE DRAWINGS

FIG. 12 is a front view of a projection system according to a third embodiment of the present invention;

FIG. 15 is a front view of a projection system according to a fifth embodiment of the present invention;

FIG. 21A is a structure view of a DOE scrolling unit of a continuous relief type;

FIG. 21B is a structure view of a DOE scrolling unit of a multiorder diffractive (MOD) lens type;

BEST MODE FOR CARRYING OUT THE INVENTION

Figure 1:
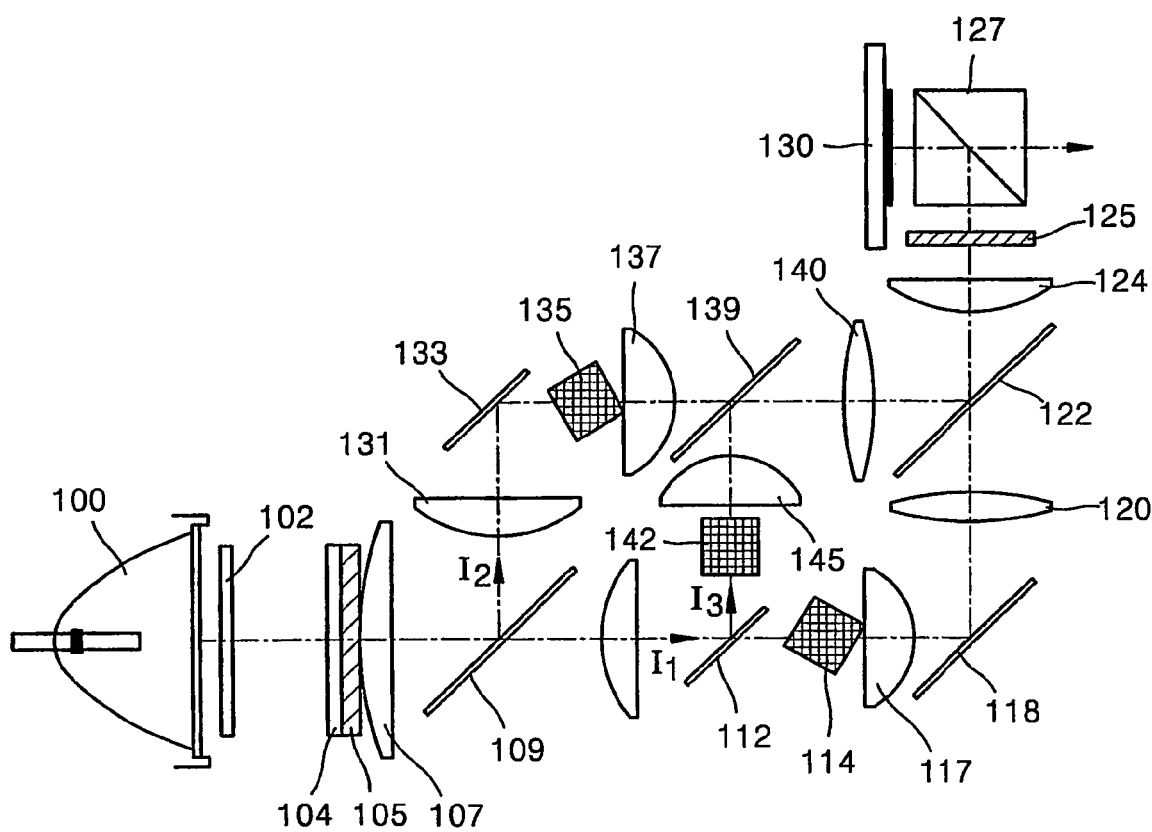
FIG. 1 shows a conventional projection system disclosed in U.S. Application No. 2002/191154 A1.
Figure 2:
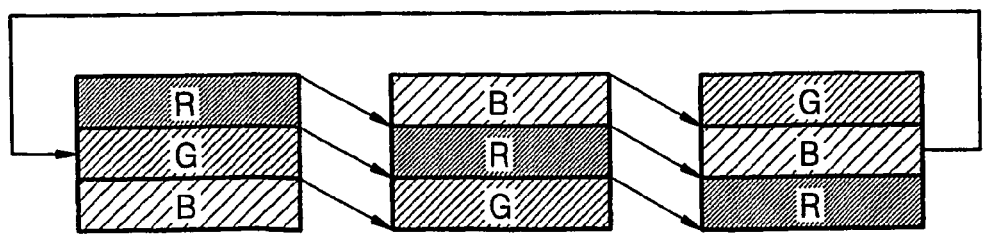
FIG. 2 is a view for explaining a method of scrolling color bars used in the projection system shown in FIG. 1.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Figure 3:
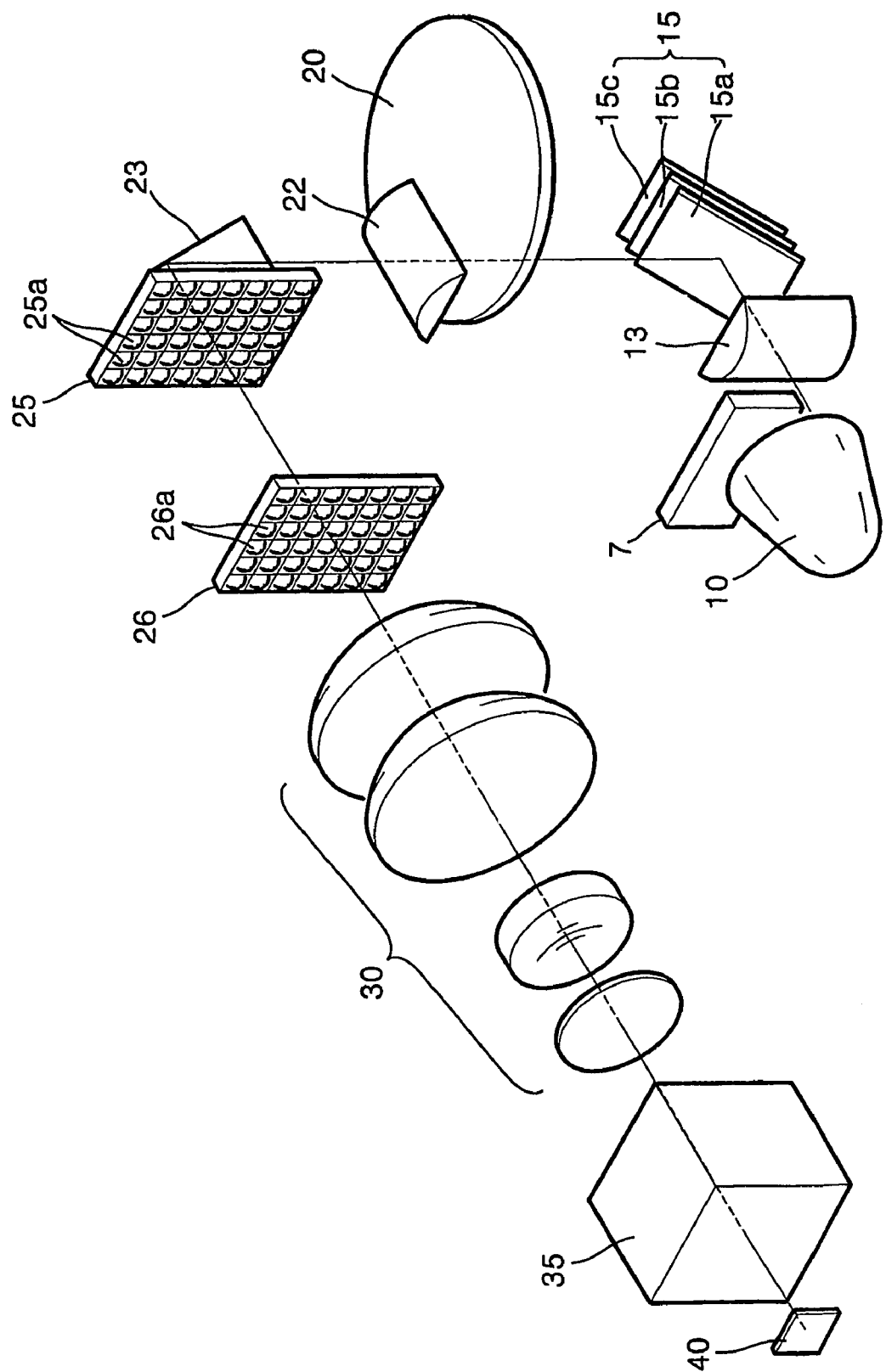
FIG. 3 is an exploded perspective view of a projection system according to a first embodiment of the present invention.

Referring to FIG. 3, a projection system according to a first embodiment of the present invention includes a light source 10, an optical splitter 15 splitting light emitted from the light source 10 into color light beams according to a wavelength, at least one scrolling unit 20 scrolling the color light beams split by the optical splitter 15, and a light valve 40 processing the color light beams scrolled by the scrolling unit 20 according to an image signal to form a color image.

At least one fly eye lens (e.g., first and second fly eye lenses 25 and 26) and a group of lenses 30 may be further installed in an optical path between the scrolling unit 20 and the light valve 40. The color image formed by the light valve 40 is magnified and projected onto a screen by a projection lens system (not shown).

Figure 4A:
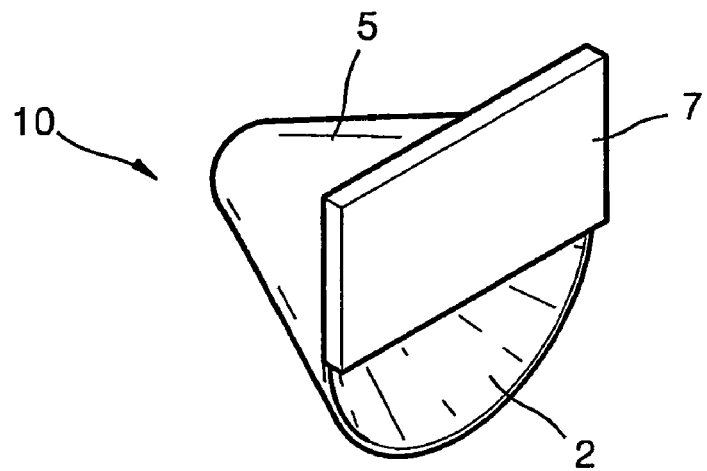
FIGS. 4A and 4B are views showing a lighting system according to an embodiment of the present invention.
Figure 4B:
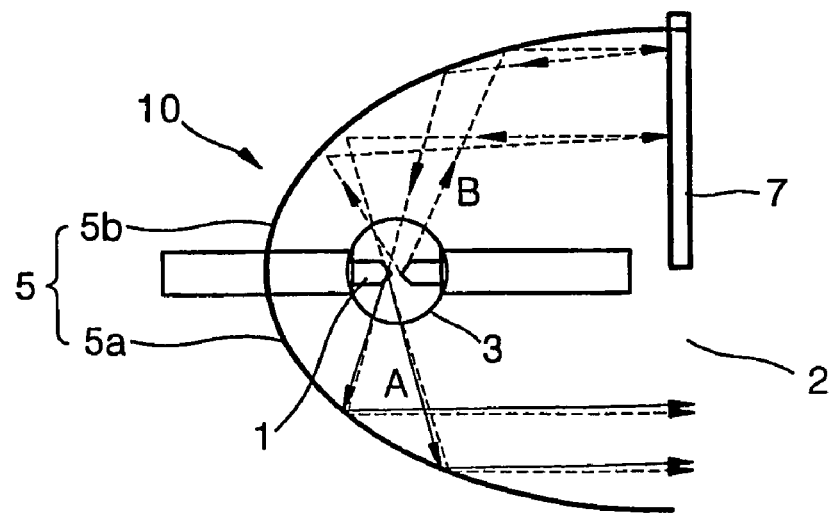

Referring to FIGS. 4A and 4B, the light source 10 emits white light and is a lamp light source in which light (radial light or arc light) emitted from a bulb 3 having discharging tips 1 is reflected by a reflection mirror 5. As shown in FIG. 4A, at least one reflecting unit 7 is installed at the light source 10 to cover (block) a portion of an opening 2 of the light source 10 in order to reduce etendue E. The reflection mirror 5 may be an elliptic mirror whose first focal point is the bulb 3 and a second focal point is a point where light is focused. Alternatively, the reflection mirror may be a parabolic mirror which uses the bulb 3 as a focal point and collimate light beams that are emitted from the discharging tips 1 and reflected by the reflection mirror 5. The reflection mirror 5 shown in FIGS. 4A and 4B is a parabolic mirror.

Referring to FIG. 4B, light beams emitted from the bulb 3 having the discharging tips 1 are reflected by the reflection mirror 5. Some of the reflected light beams are discharged from the light source 10 through the opening 2. The rest light beams are also reflected by the reflection unit 7 toward the reflection mirror 5. The reflection mirror 5 reflects the received light beams toward the opposite side, and the reflected light beams are discharged from the light source 10 through the opening 2.

An appropriate number of reflection units 7 may be arranged in various shapes in proper positions to reduce the etendue E of a light source. For example, the reflection unit 7 may be disposed at one side of the opening 2 of the reflection mirror 5. As shown in FIG. 4B, the reflection unit 7 may be arranged at an upper semicircular portion of the opening 2 of the reflection mirror 5. Besides these positions, the reflection unit 7 may be arranged at a lower semicircular portion, a left semicircular portion, or a right semicircular portion of the opening 2 of the reflection mirror 5. In these cases, the etendue E is the same.

Figure 5:
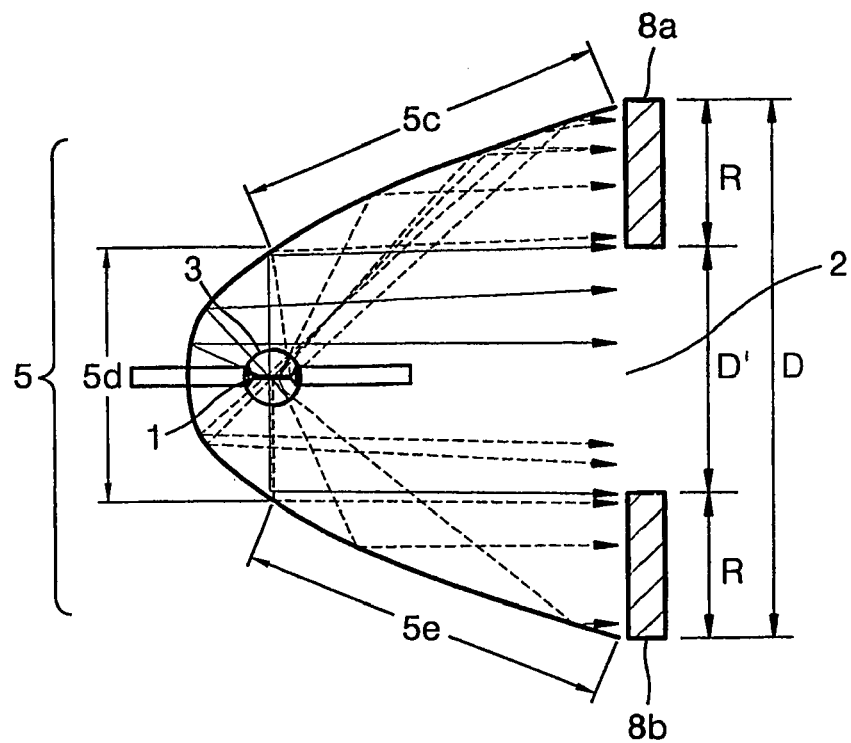
FIGS. 5 and 6 are views showing a lighting system according to another embodiment of the present invention.

As another method, as shown in FIG. 5, first and second reflection units 8a and 8b are installed, and they may be symmetrically arranged based on the opening 2 of the reflection mirror 5. Here, the first and second reflection units 8a and 8b are symmetrically arranged at upper and lower positions of the opening 2 of the reflection mirror 5. However, the first and second reflection units 8a and 8b may also be symmetrically arranged on right and left positions of the opening 2 of the reflection mirror 5. D denotes a total diameter of the opening 2, and R denotes the widths of the first and second reflection units 8a and 8b. Also, a diameter (length) D' of an actual (effective) opening of the opening 2 is expressed by a formula, (D−2R)=D'.

A process of reducing the etendue E by installing at least one reflection unit to block the opening 2 of the reflection mirror 5 will be described. Referring to FIG. 4B, the bulb 3 emits the radial light. Here, the reflection mirror 5 is divided into a first reflection mirror 5a at which the reflection unit 7 is not installed, and a second reflection mirror 5b at which the reflection unit 7 is installed. A first light beam emitted toward the first reflection mirror 5a is represented with A, and a second light beam emitted toward the second reflection mirror 5b is represented with B. First, the first light beam A emitted toward the first reflection mirror 5a is reflected by the first reflection mirror 5a and immediately emitted to an outside of the light source 10. The second light beam B emitted toward the second reflection mirror 5b is reflected by the second reflection mirror 5b, reflected again toward the second reflection mirror 5b by the reflection unit 7, reflected toward the first reflection mirror 5a, and emitted to the outside of the light source 10 through the actual opening of the opening 2.

Finally, the actual area of the opening 2 through which the bulb 3 emits the light can be reduced without losing a total amount of the light. In other words, in a case where the reflection unit 7 is not installed, light is emitted throughout the opening 2 of the reflection mirror 5. However, by installing the reflection unit 7, light of the same amount as light emitted throughout the opening 2 can be emitted through only a portion of the opening 2 of the reflection mirror 5. The etendue E of the light source 10 can be reduced when the actual area of the opening 2 of the reflection mirror through which light is emitted is reduced.

As shown in FIG. 5, a case where the first and second reflection mirrors 8a and 8b are symmetrically installed based on the opening 2 will be described. Here, the reflection mirror 5 is divided into a third reflection mirror 5c at which the first reflecting unit 8a is installed, a fourth reflection mirror 5d at which both the first and second reflection units 8a and 8b are not installed, and a fifth reflection mirror 5e at which the second reflecting unit 8b is installed.

The bulb 3 emits the radial light, a portion of which is reflected by the fourth reflection mirror 5d and immediately emitted outside, and a remaining portion of which is reflected by the third and fifth reflection mirrors 5c and 5e, proceeds toward the first and second reflection units 8a and 8b, is reflected by the first and second reflection units 8a and 8b, is reflected by the third and fifth reflection mirrors 5c and 5e, and is emitted via a portion of the opening 2 which is not covered by any reflecting unit 80a, 80b. Accordingly, the actual area of the opening 2 of the reflection mirror 5 through which the light is emitted can be reduced, thereby reducing the etendue E.

In detail, the light emitted toward the third reflection mirror 5c is reflected by the first reflection unit 8a, reflected again by the third and fifth reflection mirrors 5c and 5c, and emitted through the actual opening having the diameter D' and not having any reflection unit installed. Also, the light emitted toward the fifth reflection mirror 5c is reflected by the second reflection unit 8b, reflected again by the fifth reflection mirror 5e and the fourth reflection mirror 5d, and emitted through the actual opening having the diameter D' and not having any reflection unit installed to cover the actual opening. Thus, the actual area through which light is emitted can be more reduced than when the first and second reflection units 8a and 8b are not installed so as to reduce the etendue.

Figure 6:
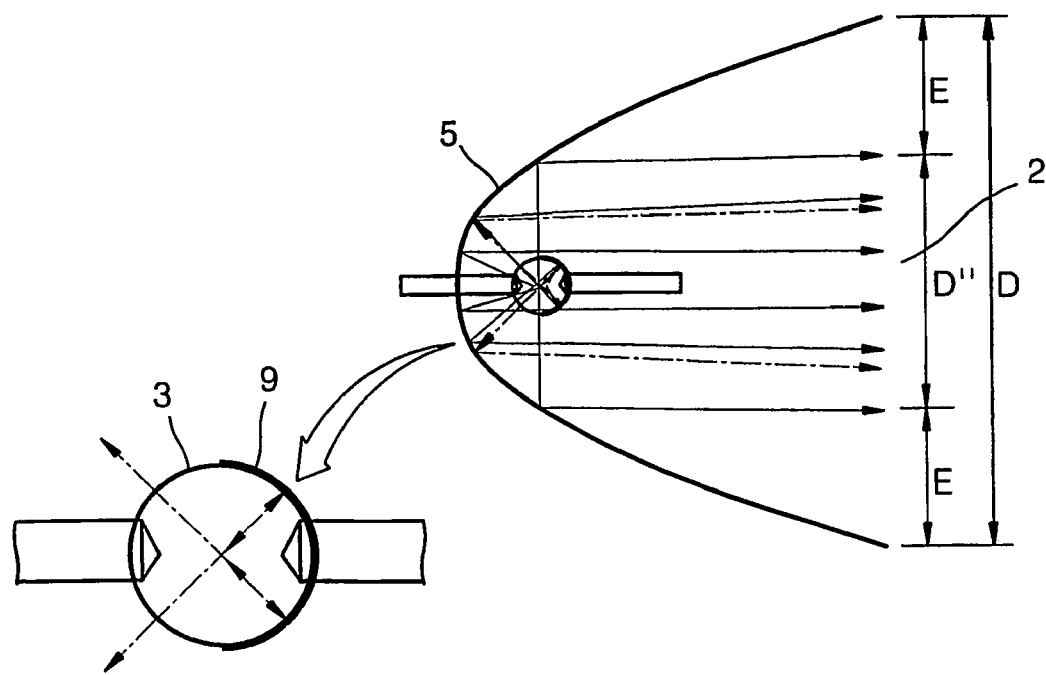

Referring to FIG. 6, in another light source 10 including the reflection mirror 5 having the bulb 3 with the discharging tips 1, only a portion of the bulb 3 is coated with a reflective film or a reflection unit 9 in order to reduce the etendue E of the light source 10. For example, the portion of the bulb 3 facing the reflection mirror 5 is coated with the reflective film or the reflecting unit 9. A portion of the radial light emitted from a remaining portion of the bulb 3 which is not coated with the reflective film or the reflection unit 9 is reflected by the reflection mirror 5 and emitted outside the light source 10. The light emitted toward the reflective film or the reflection unit 9 is reflected toward the reflection mirror 5 by the reflective film or the reflection unit 9, reflected again by the reflection mirror 5, and emitted to the outside the light source 10.

Here, D denotes the whole diameter of the opening 2 of the reflection mirror 5, E denotes the diameter of a first area of the opening 2 through which the light is not emitted due to the reflective film or the reflection unit 9, and D" denotes the diameter of a second area of the opening 2 through which the light is emitted. In FIG. 6, the reflective film or the reflection unit 9 is formed approximately on a hemispherical surface of the bulb 3. However, an area and a position in which the reflective film or the reflection unit 9 is installed may vary. Thus, the etendue of the light source 10 can be adequately controlled.

After reducing the etendue using the above-described methods, the light emitted from the light source 10 is split into at least two color light beams by the optical splitter 15. For example, the optical splitter 15 may be constituted by first, second, and third dichroic filters 15a, 15b, and 15c which are arranged to be separated at a proper angle with respect to the light source 10. The light emitted from the light source 10 is split into the R, G, and B color light beams by the first, second, and third dichroic filters 15a, 15b, and 15c, respectively, and then scrolled by the scrolling unit 20.

Although one scrolling unit 20 is included herein, two or more scrolling units 20 may be included.

Figure 7A:
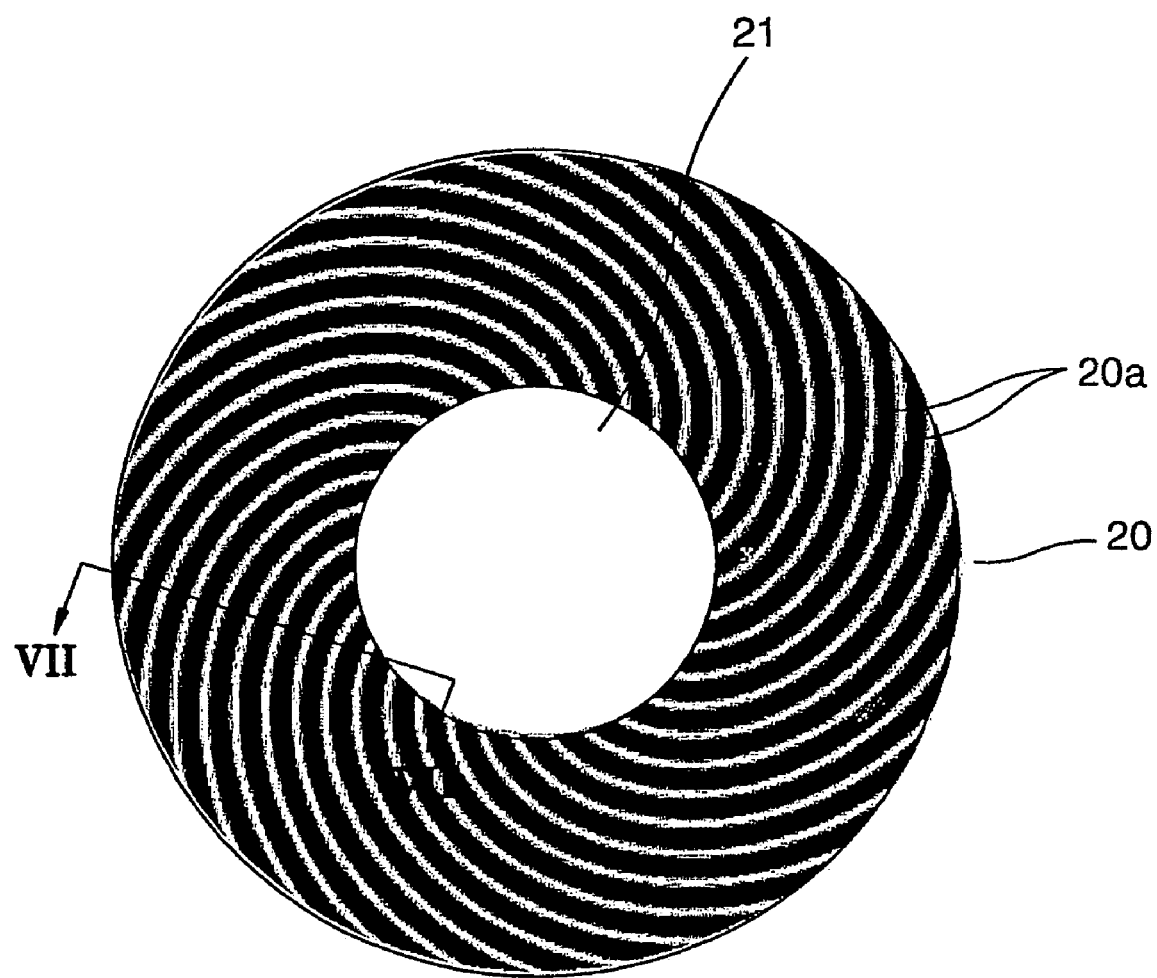
FIG. 7A is a front view of a color scrolling unit employed in a projection system according to the present invention.
Figure 7B:
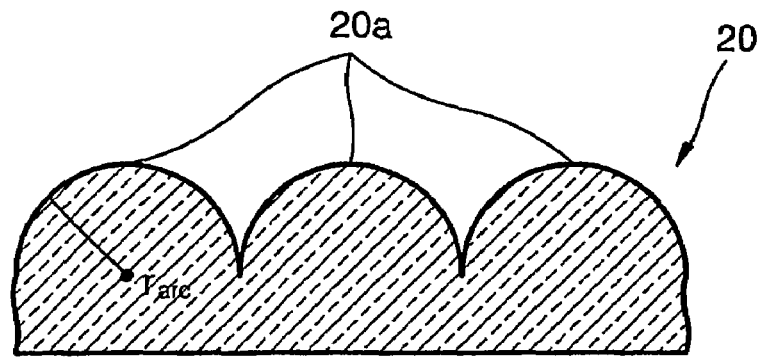
FIG. 7B is a cross-section view taken along line VII-VII of FIG. 7A.
Figure 7C:
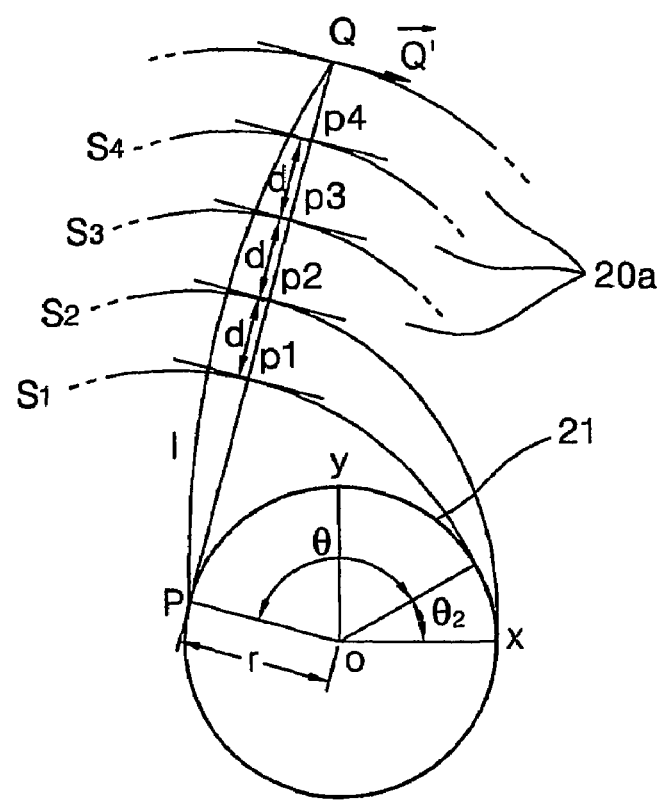
FIG. 7C is a diagram for explaining a process of designing the color scrolling unit of FIG. 7A.

Referring to FIG. 7A, the scrolling unit 20 is formed by spirally arranging at least one lens cell 20a. The cross-section of the scrolling unit 20 has a cylinder lens array structure in which each cylinder lens has a shape of an arc having a radius of curvature $r_{arc}$, as shown in FIG. 7B. For example, the lens cells 20a may be cylindrical lenses, and the scrolling unit 20 may have a disk shape. However, the shape of the scrolling unit 20 is not limited to the disk shape but may be a cylindrical shape. Hence, the lens cells 20a may be arranged spirally around the curve surface of the cylindrical scrolling unit 20.

The scrolling unit 20 is designed by spirally arranging the lens cells 20a using an involute function. The involute function is widely used for gear design and can be considered as a trace along which a thread tip unbound from a spool has passed. To be more specific with reference to FIG. 6C, a tangent line is drawn from a point of contact, P, on a central circle 21 of the scrolling unit 20 to an arbitrary point Q, and a segment $\overline{PQ}$ is equally divided to create imaginary equal division points p1, p2, p3, and p4. When each of the points is considered as the tip of a thread unbound by a predetermined short length from a spool, Equation 1 can be obtained:

$$I = r * \theta$$

$$\overrightarrow{OP} = r(\cos\theta, \sin\theta) \quad (1)$$

wherein r denotes the radius of the central circle 21, I denotes the length of the segment $\overline{PQ}$, θ denotes an angle at which a threshold with a length I is bound on the central circle 21, and $\overrightarrow{OP}$ denotes a vector from the origin O to the point P. Since $\overrightarrow{PQ}$ is a vector drawn from the point P to the tangent line, $\overrightarrow{PQ}$ is a tangential vector of OP and has the length I. Accordingly, $\overrightarrow{PQ}$ can be expressed in Equation 2:

$$\overrightarrow{PQ} = I(\sin\theta, -\cos\theta) = r\theta(\sin\theta, -\cos\theta) \quad (2)$$

Referring to Equations 1 and 2, $\overrightarrow{OQ}$ is obtained using Equation 3:

$$\overrightarrow{OQ} = \overrightarrow{OP} + \overrightarrow{PQ} \quad (3)$$
$$= (r\cos\theta + r\theta\sin\theta, r\sin\theta - r\theta\cos\theta)$$

If a tangential vector of $\overrightarrow{PQ}$ is $\overrightarrow{Q'}$ and the size of $\overrightarrow{Q'}$ is I, $\overrightarrow{Q'}$ is obtained using Equation 4:

$$\overrightarrow{Q'} = I(\cos\theta, \sin\theta) = r\theta(\cos\theta, \sin\theta) \quad (4)$$

The vectors $\overrightarrow{PP_1}$, $\overrightarrow{PP_2}$, $\overrightarrow{PP_3}$, and $\overrightarrow{PP_4}$ of the points p1, p2, p3, and p4 have the same point of contact, P, on the central circle 21, the same radius r, and the same angle θ. Accordingly, it can be seen from Equation 4 that the tangential vector $\overrightarrow{Q'}$ at each point is the same.

In addition, in adjacent spiral curves ($S_1$ and $S_2$), ($S_2$ and $S_3$) or ($S_3$ and $S_4$), the second spiral curve can be considered having been rotated a predetermined angle $\theta_2$ from the first spiral curve. If it is assumed that a scrolling unit is divided into n cells, the rotation angle $\theta_2$ between the adjacent curves ($S_1$ and $S_2$), ($S_2$ and $S_3$) or ($S_3$ and $S_4$) can be obtained using Equation 5:

$$\theta_2 = \frac{2\pi}{n} \quad (5)$$

According to Equation 1, the size I of $\overrightarrow{PQ}$ is proportional to θ, so the distance d between adjacent points p1 and p2, p2 and p3, or p3 and p4 is also proportional to the rotation angle $\theta_2$. Accordingly, the distance between adjacent points p1 and p2, p2 and p3, or p3 and p4 is the same as the shortest distance d between adjacent curves ($S_1$ and $S_2$), ($S_2$ and $S_3$) or ($S_3$ and $S_4$), and the distance d can be obtained using Equation 6:

$$d = r * \theta_2 = r * \frac{2\pi}{n} \quad (6)$$

It can be seen from Equation 6 that the shortest distance d between the adjacent curves ($S_1$ and $S_2$), ($S_2$ and $S_3$) or ($S_3$ and $S_4$) is constant because n and r are constant. A coordinate $Q_k$ of a k-th curve $S_k$ is obtained by rotating the first curve $S_1$ by $(k-1)*\theta_2$. Accordingly, when the coordinate of the first curve $S_1$ is $Q_1$, the coordinate $Q_k$ of the k-th curve $S_k$ can be expressed as in Equation 7:

$$Q_k = Rot((k-1)*\theta_2)*Q_1 = Rot\left(\frac{2\pi(k-1)}{n}\right)*Q_1 \quad (7)$$

wherein Rot denotes a rotation unit vector for rotating a point at an arbitrary angle. Equation 7 can be expressed in a determinant, Equation 8:

$$\begin{pmatrix} Q_{k,x} \\ Q_{k,y} \end{pmatrix} = \begin{pmatrix} \cos(k-1)\theta_2 & -\sin(k-1)\theta_2 \\ \sin(k-1)\theta_2 & \cos(k-1)\theta_2 \end{pmatrix} \begin{pmatrix} Q_{1,x} \\ Q_{1,y} \end{pmatrix} \qquad (8)$$

Referring to Equation 8, x and y coordinates of the k-th curve can be obtained from Equation 9:

$$Q_{kx} = Q_{1,x} \cos(k-1)\theta_2 - Q_{1,y} \sin(k-1)\theta_2$$

$$Q_{ky} = Q_{1,y} \sin(k-1)\theta_2 - Q_{1,y} \cos(k-1)\theta_2 \qquad (9)$$

Curves on a lens cell can be formed along a track obtained by Equation 9, the cross-sectional shape of the scrolling unit is an arch having the radius of curvature $r_{arc}$, and the size of the scrolling unit is not specifically limited. The distance d between adjacent curves is calculated using Equation 6, and the entire shape of the scrolling unit can be designed using the calculated distance d. Additionally, the inner radius of the scrolling unit must be greater than the inner radius r of a spool, that is, the central circle 21, and the outer diameter thereof is not limited. As described above, the scrolling unit according to the present invention is designed to have a spiral shape in which, when normal lines are drawn with respect to an arbitrary tangent line on a spool, that is, the central circle 21, at regular intervals, tangential vectors at intersection points p1, p2, p3, and p4 between the tangent line and each of the normal lines satisfy the same condition. Since the distance d is the shortest distance between adjacent lens cells on the scrolling unit, and the tangential vectors at the intersection points p1, p2, p3, and p4 are the same, the shapes of the lens cells have the same curvature.

Referring back to FIG. 3, the light source 10 of the projection system according to the first embodiment of the present invention includes a reflection unit 8 and accordingly can reduce the etendue of the light source 10 without light loss. The light emitted from the light source 10 is separated into color beams by the optical splitter 15. For example, the optical splitter 15 can be constructed with first, second, and third dichroic filters 15a, 15b, and 15c disposed aslant at different angles with respect to an incidence light axis. The optical splitter 15 separates incident light according to a predetermined wavelength range and advances the separated light beams at different angles. For example, the first dichroic filter 15a reflects a beam in the red wavelength range, R, from white incident light and, at the same time, transmits beams in the green and blue wavelength ranges, G and B. The second dichroic filter 15b reflects the G beam from the beams transmitted by the first dichroic filter 15a and, at the same time, transmits the B beam. The third dichroic filter 15c reflects the B beam transmitted by the first and second dichroic filters 15a and 15b.

The R, G, and B beams into which incident light has been separated according to wavelength by the first, second, and third dichroic filters 15a, 15b, and 15c are reflected at different angles. For example, the R and B beams converge on the G beam. The separated colors are incident upon the scrolling unit 20 and each scrolled by the scrolling unit 20. The scrolling will be described later.

Figure 8:
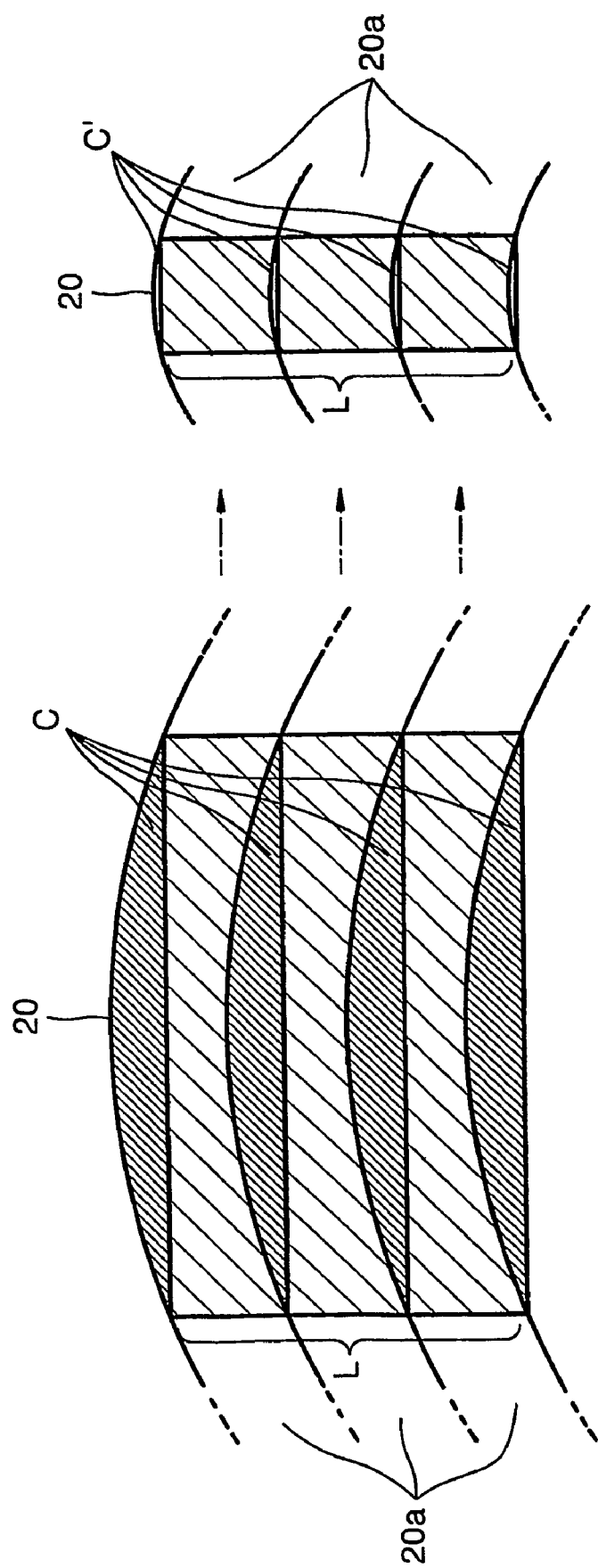
FIG. 8 shows the shapes of beams when the beams pass through a scrolling unit both in a projection system including no cylinder lenses and in a projection system including cylinder lenses.

Preferably, a first cylinder lens 13 is provided before the scrolling unit 20, to be more specific, before the optical splitter 15, and a second cylinder lens 22 is further provided behind the scrolling unit 20. The first cylinder lens 13 reduces the width of a beam incident on the scrolling unit 20, and the second cylinder lens 22 collimates a beam that is diverged by passing through the scrolling unit 20. Referring to FIG. 8, a beam that is emitted from the light source 10 and incident upon the scrolling unit 20 without passing through the first cylinder lens 13 is compared to a beam that has a width reduced by the first cylinder lens 13 and then is incident upon the scrolling unit 20.

When a beam passing through the scrolling unit 20 is relatively wide, the shape of a spiral lens array does not match with that of the beam, and thus light loss of an unmatched area is caused. To minimize the light loss, preferably, the first cylinder lens 13 is provided to reduce the width of the beam so that the shape of the spiral lens array matches with that of the beam as much as possible.

Thereafter, light passed through the scrolling unit 20 is turned into light that is parallel by the second cylinder lens 22. As described above, the width of light is controlled by the first and second cylinder lenses 13 and 22, thereby reducing light loss and improving the quality of a color image.

The path of the light passed through the scrolling unit 20 is changed by a light path conversion unit 23, and then the path-changed light is focused on the first and second fly eye lens arrays 25 and 26. The light incident upon the first and second fly eye lens arrays 25 and 26 is divided by lens cells 25a and 26b, and beams of the same colors are overlapped and focused on the light valve 40 by the lens group 30, thereby forming color bars. Here, beams of different colors are focused on different areas of the light valve 40. The lens group 30 can be constituted of a condenser lens and a relay lens.

A prism 35 is further provided between the lens group 30 and the light valve 40 in order to selectively change a light path. For example, the prism 35 can transmit a beam that advances toward the light valve 40 via the lens group 30 and reflect a beam reflected by the light valve 40 toward a projecting lens unit (not shown). An image formed by the light valve 40 is magnified by the projecting lens unit and the magnified image lands on a screen. In this way, a color image is produced. The light valve 40 can be an LCD, a LCOS, a DMD, etc.

Figure 9:
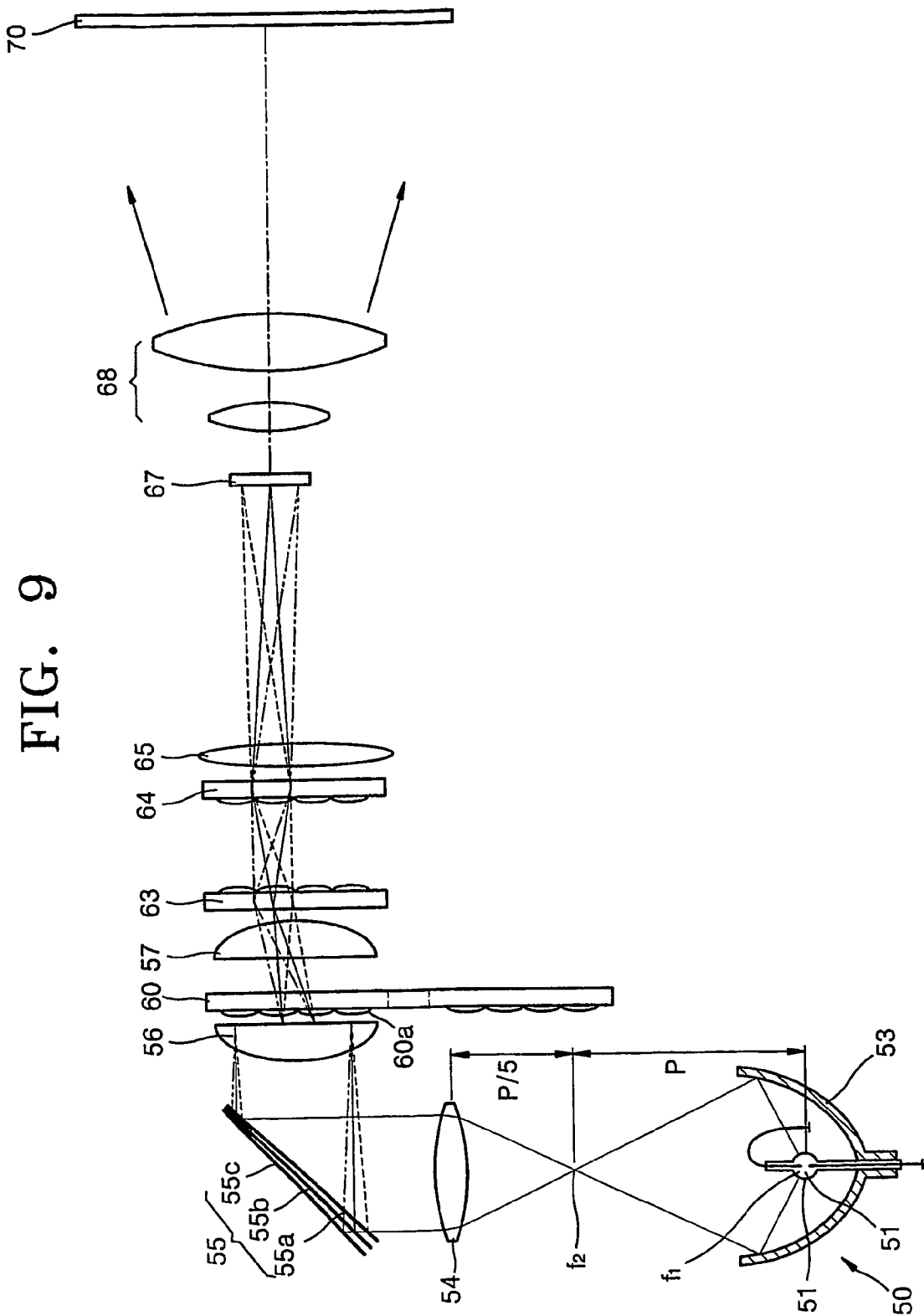
FIG. 9 is a schematic diagram of a projection system according to a second embodiment of the present invention.

Referring to FIG. 9, a projection system according to a second embodiment of the present invention includes a light source 50, an optical splitter 55 splitting light emitted from the light source 50 into color light beams according to a wavelength, at least one scrolling unit 60 scrolling the color light beams split by the optical splitter 55, and a light valve 67 processing the color light beams scrolled by the scrolling unit 60 according to an image signal to form a color image. The color image formed by the light valve 67 is magnified and projected onto a screen 70 by a projection lens system 68.

The light source 50 emits white light and includes a lamp 51 which generates light and a reflection mirror 53 which reflects light emitted from the lamp 51 and guides the path of the reflected light. The reflection mirror 53 may be an elliptic mirror whose first focal point $f_1$ is the position of the lamp 51 and a second focal point $f_2$ is a point where light is focused. Alternatively, the reflection mirror 53 may be a parabolic mirror which sets the position of the lamp 51 as its focal point and is capable of collimate light beams that are emitted from the lamp 51 and reflected by the reflection mirror 53. The reflection mirror 5 shown in FIG. 9 is an elliptic mirror. If a parabolic mirror is used as the reflection mirror 53, a lens for focusing light must be further included behind the light source 50.

A collimating lens 54 for collimating incident light is installed on a light path between the light source 50 and the optical splitter 55. Preferably, the collimating lens 54 is installed p/5 apart from the second focal point $f_2$. Here, p denotes the distance between the lamp 51 and the second focal point $f_2$ where light emitted from the lamp 51 is focused. By installing a projection system in this way, the structure of an optical system can be made more compact.

The light emitted from the light source 50 is split into at least two color light beams by the optical splitter 55. The optical splitter 55 can be constructed with first, second, and third dichroic filters 55*a*, 55*b*, and 55*c* disposed aslant at different angles with respect to an incidence light axis. The optical splitter 55 separates incident light according to a predetermined wavelength range and advances the separated light beams at different angles. For example, the first dichroic filter 55*a* reflects a beam in the red wavelength range, R, from white incident light and, at the same time, transmits beams in the green and blue wavelength ranges, G and B. The second dichroic filter 55*b* reflects the G beam from the beams transmitted by the first dichroic filter 55*a* and, at the same time, transmits the B beam. The third dichroic filter 55*c* reflects the B beam transmitted by the first and second dichroic filters 55*a* and 55*b*.

The R, G, and B beams into which incident light has been separated according to wavelength by the first, second, and third dichroic filters 55*a*, 55*b*, and 55*c* are reflected at different angles. For example, the R and B beams converge on the G beam, and the converged R, G, and B color beams are incident upon the scrolling unit 20.

The scrolling unit 60 is rotatable. Preferably, at least one lens cell 60*a* is arranged to convert the rotation of the scrolling unit 60 into a rectilinear motion of the incident light. For example, the scrolling unit 60 is formed by spirally arranging at least one lens cell 60*a*. Each of the lens cells 60*a* divides the incident light into a plurality of beams. Here, the lens cells 60*a* may be cylindrical lenses.

Preferably, first and second cylinder lens 56 and 57 are installed before and after the scrolling unit 20, respectively. First and second fly eye lens arrays 63 and 64 and a relay lens 65 are installed along the light path between the scrolling unit 60 and the light valve 67.

As described above, the width of light incident upon the scrolling unit 60 is reduced by the first cylinder lens 56.

A scrolling operation performed by the scrolling unit 60 will now be described with reference to FIGS. 11A through 11C.

Figure 10:
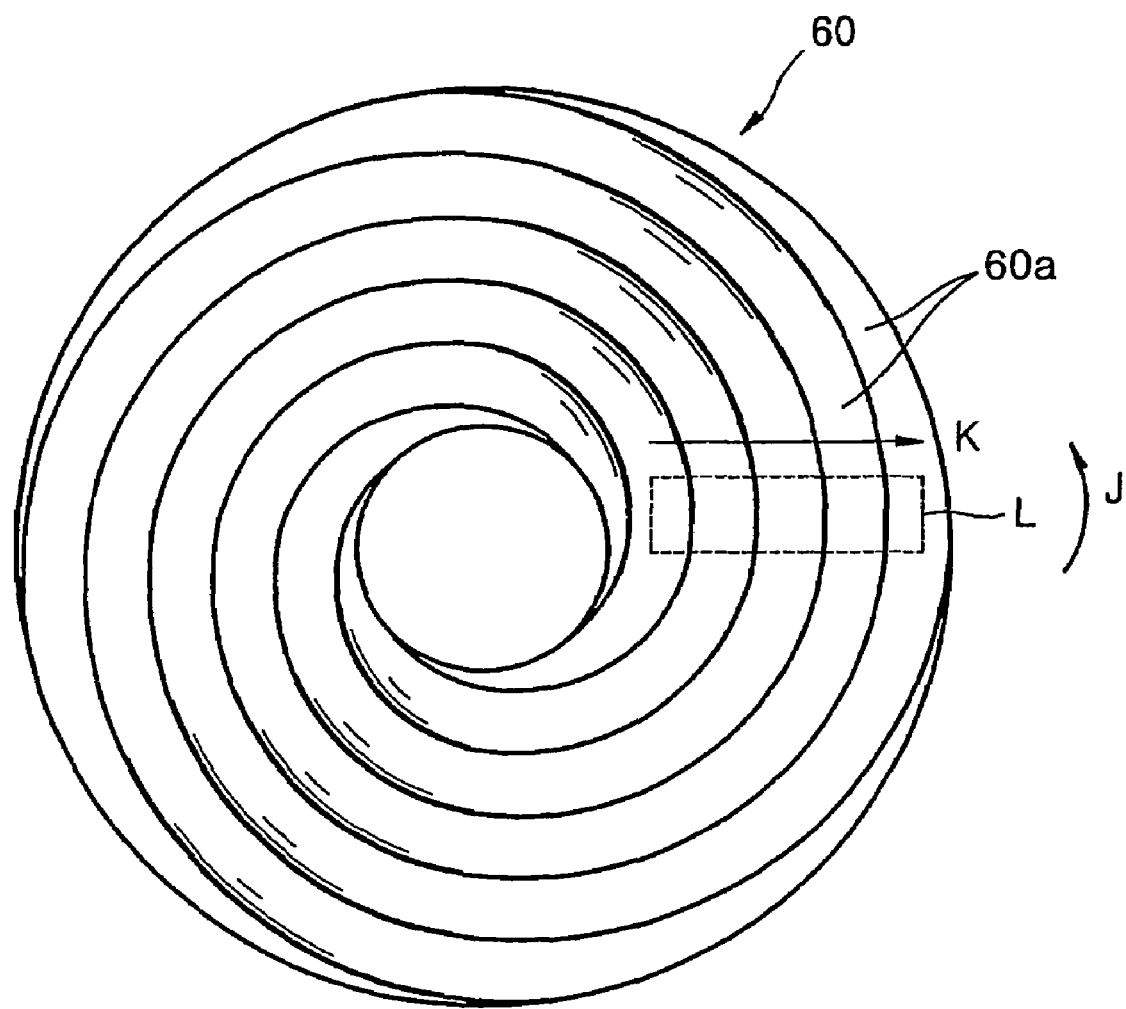
FIG. 10 shows the color scrolling operation depending on the rotation of a scrolling unit according to the present invention.

Before starting the description of the scrolling operation, referring to FIG. 10, incident light is divided into light beams with different wavelengths (i.e., R, G, and B beams) by the first, second, and third dichroic mirrors 55*a*, 55*b*, and 55*c*, and the light beams with different wavelengths advance toward the scrolling unit 60 at different angles. At least two color beams into which the incident light is split by the optical splitter 55 are repeatedly incident on each of the lens cells 60. Here, the light beams transmitted by the scrolling unit 60 are indicated by reference character L. The at least two color beams (e.g., R, G, and B beams) are focused on the scrolling unit 60 in such a way that different color beams are focused on different areas. When the scrolling unit 60 rotates at a uniform speed, an effect where the light beams L appears to make a rectilinear motion can be obtained. The rectilinear motion is made in a direction where the light beams L becomes more distant from or closer to the rotation axis of the scrolling unit 60. In FIG. 10, when the scrolling unit 60 rotates in a direction indicated by arrow J, light beams incident upon the scrolling unit 60 appear to make rectilinear motions in the direction where the light beams L become distant from the rotation axis of the scrolling unit 60.

Alternatively, from the point of view of the light beams L, lens arrays installed on the path of the light beams L appear to make rectilinear motions when the scrolling unit 60 rotates. In other words, as the scrolling unit 60 rotates, the positions of the light beams L transmitted by the scrolling unit 60 appear to change. This position change is rectilinearly made in the direction where the light beams L become more distant from or closer to the rotation axis of the scrolling unit 60. However, if the scrolling unit 60 is cylindrical, the rectilinear motion of the lens arrays is made based on the rotation axis of the scrolling unit 60.

Figure 11A:
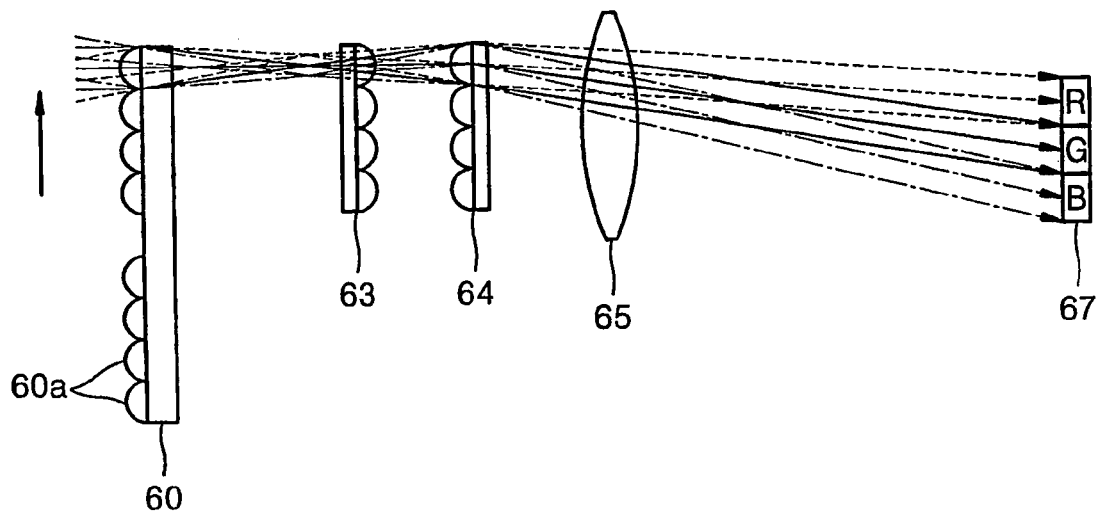
FIGS. 11A through 11C show color scrolling methods performed in a projection system according to the present invention.
Figure 11B:
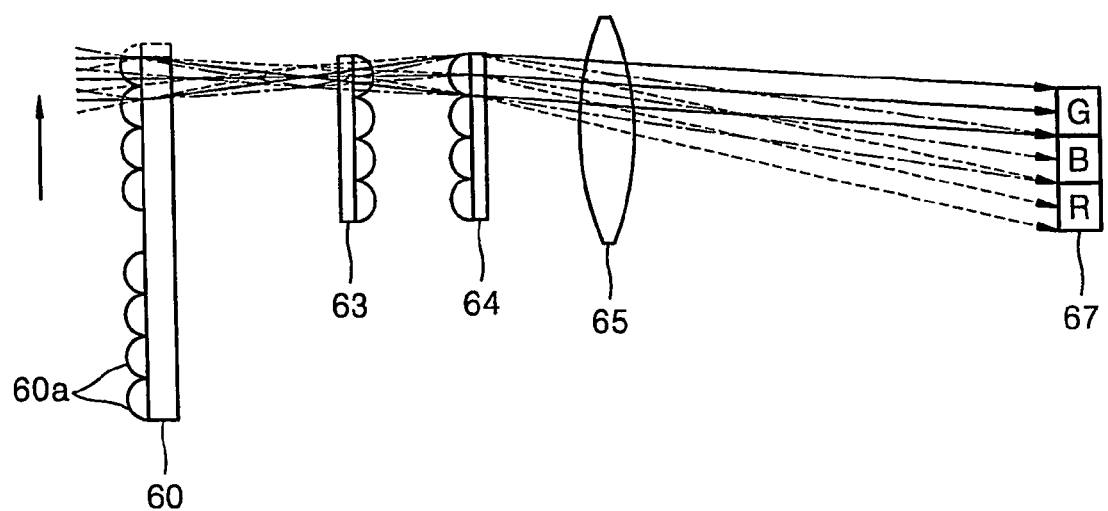
Figure 11C:
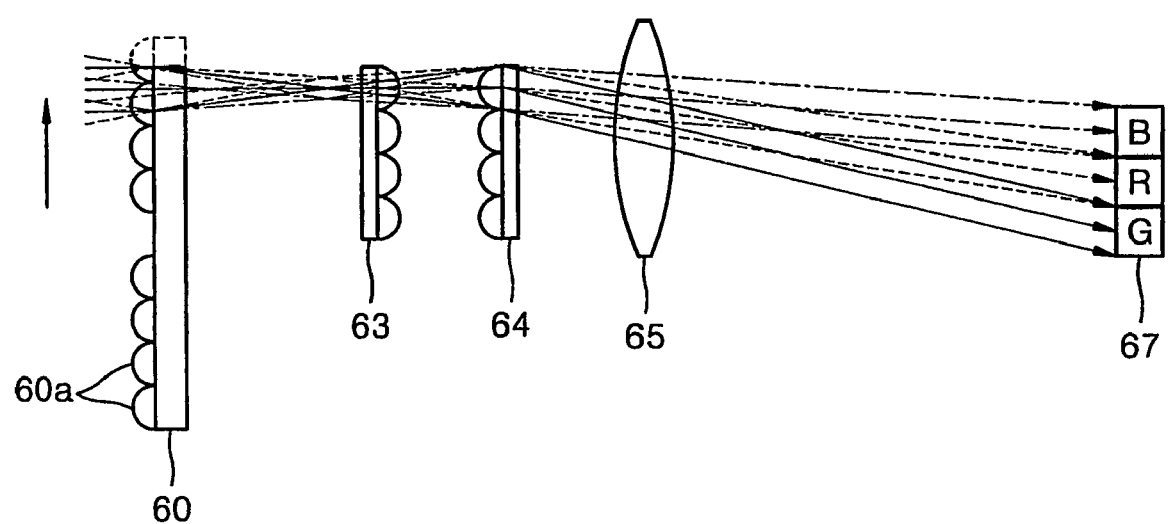

As shown in FIG. 11A, color beams into which light is split by the optical splitter 55 are distributed on the lens cells 60*a* by the scrolling unit 60, and beams of the same colors are overlapped by each other to form different color bars on the light valve 67 by the first and second fly eye lens arrays 63 and 64 and the relay lens 65. The first and second fly eye lens arrays 63 and 64 and the relay lens 65 serve as a color bar forming unit which forms different color bars on different areas of the light valve 67 by overlapping light beams of the same color.

First, light beams pass through the scrolling unit 60, the first and second fly eye lens array 63 and 64, and the relay lens 65 and form color bars on the light valve 67, for example, in an R, G, and B order. Next, as the scrolling unit 60 rotates, the lens surface of the scrolling unit 60 gradually moves upward or downward while the light beams pass through the scrolling unit 60. Accordingly, the focal points of each of the color beams transmitted by the scrolling unit 60 change as the scrolling unit 60 moves, such that color bars in a G, B, and R order as shown in FIG. 11B are formed. Then, as the scrolling unit 60 rotates so as to be scrolled, color bars in a B, R, and G order as shown in FIG. 11C are formed. In other words, the locations of lenses upon which beams are incident change according to the rotation of the scrolling unit 60, and the rotation of the scrolling unit 60 is converted into the rectilinear motions of the lens arrays 63 and 64 at the cross-section of the scrolling unit 60 so that scrolling is performed. Such scrolling is periodically repeated.

In the present invention, particularly, the scrolling unit 60 may have various shapes in which color scrolling can be achieved by converting the rotation of the scrolling unit 60 into a rectilinear motion of incident light or lens arrays. Besides the above-described spiral arrangement, lens cells may be arranged in different ways. For example, lens cells may be spirally arranged on the curve surface of a cylindrical scrolling unit or arranged in the direction of the length of the cylindrical scrolling unit.

As described above, in the present invention, because the scrolling unit 60 is shared for all color beams without need to install a scrolling unit for each color, a projection system can be made compact, and individual colors can be more easily synchronized with one color. Color lines are formed on each of the lens cells 60*a* of the scrolling unit 60, and color lines are formed on each of the lens cells of the first fly eye lens array 63 so as to be matched with the color lines formed on the lens cells 60*a*. Hence, it is preferable that the lens cells occupied by light beams transmitted by the scrolling unit 60 individually correspond to row array of the first and second fly eye lens arrays 63 and 64. If the number of lens cells occupied by light beams transmitted by the scrolling unit 60 is four, preferably, the number of row arrays of the first and second fly eye lens arrays 63 and 64 is four.

As described above, color bars are repeatedly scrolled as the scrolling unit 60 rotates. In particular, since the scrolling unit 60 continuously rotates in one direction without changing the rotation direction in order to perform scrolling, continuity and consistency can be guaranteed. In addition, scrolling using a single scrolling unit 60 contributes to keep the speed of color bars constant and to easily synchronize the color bars.

The scrolling unit 60 scrolls incident light beams by converting the rotation of the lens cells 60a into a rectilinear motion of the lens array. That is, when the scrolling unit 60 rotates, it can be seen from the viewpoint of the cross-section of the scrolling unit 60 that the lens array moves rectilinearly so as to be farther from or closer to the rotation axis of the scrolling unit 60. Since beams with narrow widths pass through the scrolling unit 60, the effect of beams passing through the lens array that moves rectilinearly can be obtained.

The number of lens cells 60a on the scrolling unit 60 can be controlled to synchronize the scrolling unit 60 with the operating frequency of the light valve 67. That is, if the operating frequency of the light valve 67 is high, more lens cells are included so that the scrolling speed can be controlled to be faster while keeping the rotation speed of the scrolling unit 60 constant.

Alternatively, a scrolling unit can be synchronized with the operating frequency of a light value by maintaining the number of lens cells on the scrolling unit uniform and increasing the rotation frequency of the scrolling unit. For example, when the operating frequency of the light valve 67 is 960 Hz, that is, when the light valve 67 operates at 1/960 of a second per frame such that 960 frames are reproduced per second, the scrolling unit 60 can be constructed as follows. The outermost diameter of the scrolling unit 60 is 140 mm, the innermost diameter is 60 mm, the number of lens cells 60a is 32, the width of each lens cell 60a is 5.0 mm, and the radius of curvature of each lens cell 60a is 24.9 mm. In this structure, if the scrolling unit 20 reproduces 32 frames per one rotation, it must rotate 30 times per second in order to reproduce 960 frames per second. At this speed, the scrolling unit 60 must rotate 1800 times for 60 seconds, and accordingly it has a rotation speed of 1800 rpm. When the operating frequency of the light value 67 is increased by half and thus the light valve 67 operates at 1440 Hz, the scrolling unit 60 must rotate at a 2700 rpm speed in order to be synchronized with the increased operating frequency of the light valve 67.

Although FIG. 9 shows a single scrolling unit 60, a plurality of scrolling units may be included according to a design rule.

A projection system according to a third embodiment of the present invention will now be described with reference to FIG. 12. The third embodiment is different from the second embodiment in respect of the structure of an optical splitter. While the optical splitter 55 in the second embodiment includes first, second, and third dichroic filters 55a, 55b, and 55c separately disposed at different angles, an optical splitter 75 according to the third embodiment includes first, second, and third dichroic filters 75a, 75b, and 75c that are parallel to one another.

Referring to FIG. 12, the projection system according to the third embodiment of the present invention includes a light source 70, a scrolling unit 73, an optical splitter 75 for splitting the light passed through the scrolling unit 73 according to a color, a color bar forming unit for making color beams split by the optical splitter 75 be overlapped a color beam by another beam of the same color, and a light valve 80 for forming a color image by turning on/off individual pixels according to a received image signal. The scrolling unit 73 is installed before the optical splitter 75, and a prism 74 is further provided between the scrolling unit 73 and the optical splitter 75. If the light source 70 is an elliptic mirror, preferably, a collimating lens 72 is further provided between the light source 70 and the scrolling unit 73.

Light beams emitted from the light source 70 is transmitted by the scrolling unit 73 and is then made incident upon the optical splitter 75 via the prism 74. Since the scrolling unit 73 is the same as the scrolling unit 60 in the second embodiment, it will not be described in detail. The optical splitter 75 includes the first, second, and third dichroic filters 75a, 75b, and 75c that are parallel to one another.

Light beams transmitted by the scrolling unit 73 are divided as convergent light beams of different angles by each of the lens cells 73a and are then reflected at different locations on the first, second, and third dichroic filters 75a, 75b, and 75c. Thereafter, the light beams reflected by the first, second, and third dichroic filters 75a, 75b, and 75c are focused on the color bar forming unit. The color bar forming unit includes first and second fly eye lens arrays 76 and 77 and a lens group 79. The lens group 79 can be constituted of a condenser lens and a relay lens. At least two color beams into which light is split by the optical splitter 75 are focused on each of the lens cells of the first fly eye lens array 76 and overlapped according to a color by the second fly eye lens array 77. The lens group 79 makes the overlappingly-traveling beams be transmitted to the light valve 80 and focused on different areas for different colors, thereby forming color bars. Here, the lens group 79 can be replaced by at least one relay lens.

The projection system having such a structure rotates the scrolling unit 73 at a uniform speed in order to scroll the color bars formed on the light valve 80. This scrolling operation produces color images. Since the scrolling operation was already described above, it will not be described here in detail.

Figure 13:
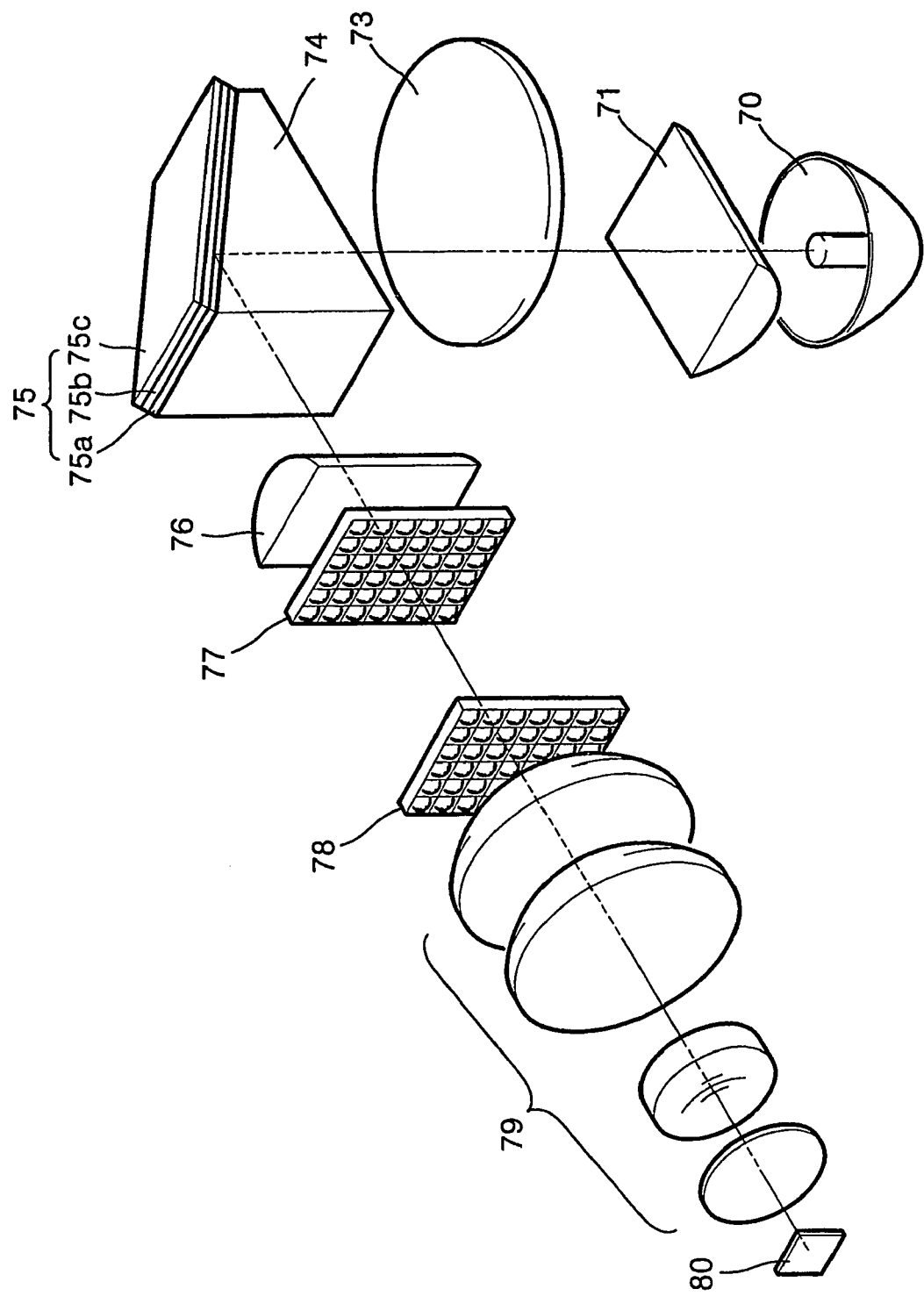
FIG. 13 is an exploded perspective view of the projection system according to the third embodiment of the present invention.

FIG. 13 shows another example of the projection system according to the third embodiment of the present invention, in which the scrolling unit 73 includes a first cylinder lens 71 for reducing the width of a beam landing on the scrolling unit 73 and a second cylinder lens 76 for collimating light transmitted by the scrolling unit 73. The first cylinder lens 71 is provided along a light path between the light source 70 and the scrolling unit 73, and the second cylinder lens 76 is provided along a light path between the optical splitter 75 and the first fly eye lens array 77.

Before light emitted from the light source 70 lands on the scrolling unit 73, the width of the beam of light is reduced by the first cylinder lens 71. By reducing the width of the beam of light landing on the scrolling unit 73, light loss due to the inconsistency of the spiral shape of a lens cell 73a with the shape of light landing on the lens cell 73a can be reduced. That is, as the width of light decreases, the difference due to the spiral curve shape can be reduced. Then, the second cylinder lens 76 restores the light beam whose width has been reduced by the first cylinder lens 71 back into the original parallel light beam.

Figure 14A:
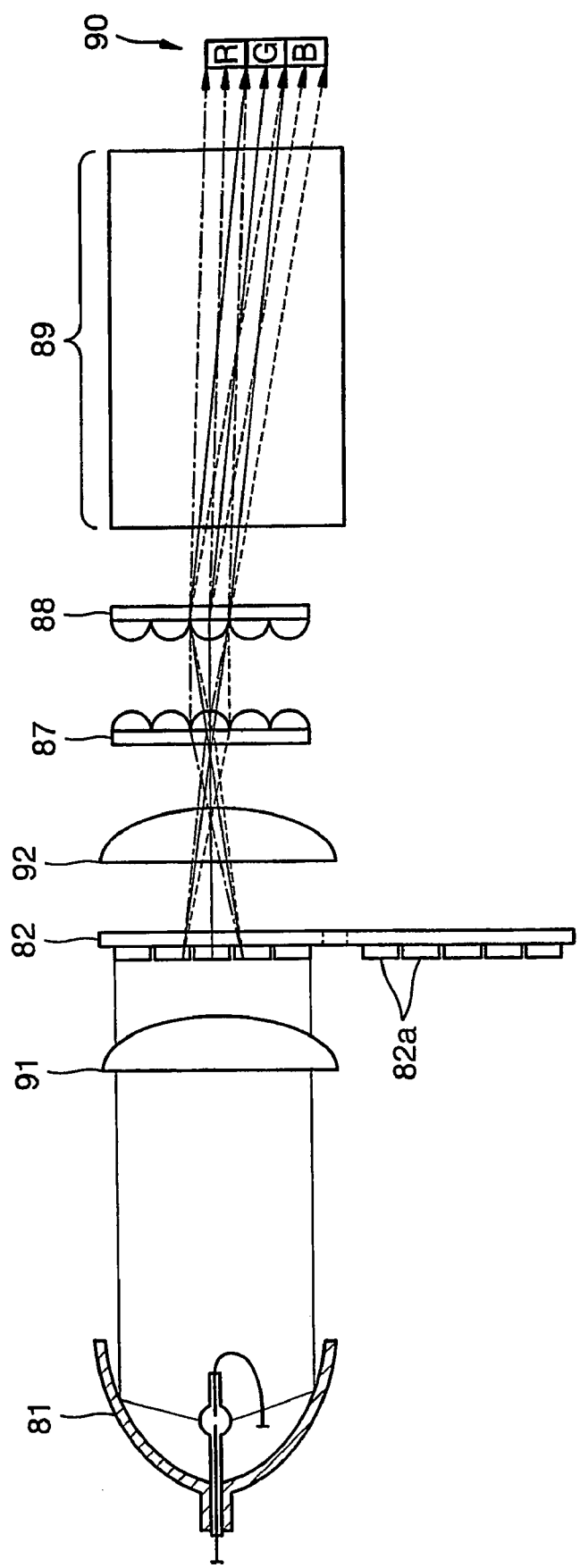
FIG. 14A a front view of a projection system according to a fourth embodiment of the present invention.

Referring to FIG. 14A, a projection system according to a fourth embodiment of the present invention includes a light source 81, a diffractive optical element (DOE) scrolling unit 82, and a light valve 90. The DOE scrolling unit 82 is provided to separate the light emitted from the light source 81 according to wavelength and scroll the separated light beams. The light valve 90 processes light transmitted by the DOE scrolling unit 82 according to an input signal to form an image. First and second fly eye lens arrays 87 and 88 and a lens group 89 are installed between the DOE scrolling unit 82 and the light valve 90. The first and second fly eye lens arrays 87 and 88 and the lens group 89 make the light beams transmitted by the DOE scrolling unit 82 be focused on different areas according to color, thereby forming color bars.

Preferably, first and second cylinder lenses 91 and 92 are disposed before and behind the DOE scrolling unit 82, respectively.

Figure 14B:
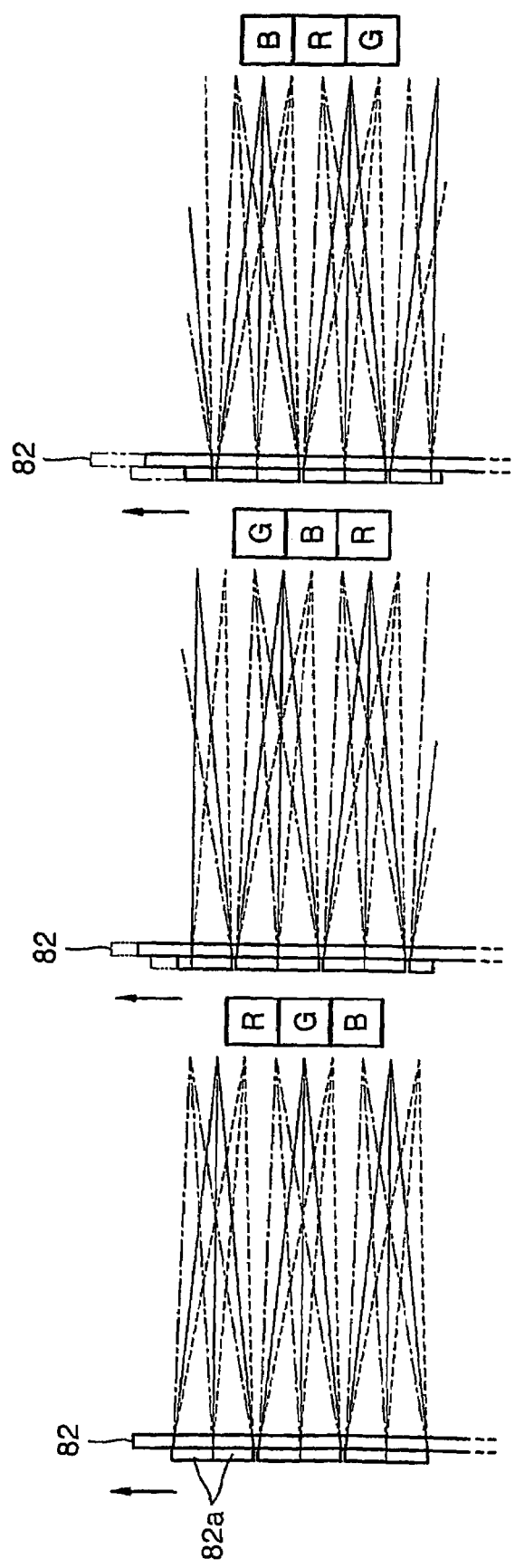
FIG. 14B shows a color scrolling method performed in the projection system according to the fourth embodiment of the present invention.

The DOE scrolling unit 82 has spirally-disposed lens cells 82a so as to achieve both the above-described separation of light emitted from the light source 81 and the scrolling of the light and is a diffraction optical device type. Since the lens cells of the DOE scrolling unit 82 are spirally disposed, a lens array on a predetermined area moves so as to become farther from or closer to the rotation axis of the DOE scrolling unit 82 as the DOE scrolling unit 82 rotates. When the DOE scrolling unit 82 rotates, the positions of the lens cells through which incident light passes are moved as shown in FIG. 14B, such that the positions of color bars that land on the light valve 90 are changed.

While the positions of the color bars formed on the light valve 90 rotate, color images are formed according to an image signal received by the light valve 90. When light emitted from the light source 81 passes through the DOE scrolling unit 82, the light is focused on different locations on the DOE scrolling unit 82 according to color, so that light separation occurs. The DOE scrolling unit can be replaced by a scrolling unit of a holography optical element (HOE) type.

Due to the use of a scrolling unit of a DOE or HOE type, the manufacturing cost can be reduced, and mass production is possible. In particular, since a single scrolling unit achieves both light separation and light scrolling, a light system with a reduced number of component parts can be obtained. A lens for focusing light emitted from the light source 81 may be included between the light source 81 and the first cylinder lens 91.

Referring to FIG. 15, a projection system according to a fifth embodiment of the present invention includes a light source 81, a DOE scrolling unit 83 for scrolling light emitted from the light source 81, an optical splitter 85 for splitting the light passed through the DOE scrolling unit 83 according to a wavelength, and a light valve 90 for forming an image by processing incident light according to a received image signal. A prism 84 is further provided between the DOE scrolling unit 83 and the optical splitter 85, and first and second fly eye lens arrays 87 and 88 and a lens group 89 are further provided along a light path between the optical splitter 85 and the light valve 90.

In the DOE scrolling unit 83, at least one cells 83a is spirally arranged. Alternatively, the DOE scrolling unit 83 can be replaced by an HOE-type scrolling unit. While the DOE scrolling unit 82 in the fourth embodiment performs both color scrolling and color separation, the DOE scrolling unit 83 performs only color scrolling.

Preferably, a first cylinder lens 91 is provided between the light source 81 and the DOE scrolling unit 83, and a second cylinder lens 92 is provided between the optical splitter 85 and the first fly eye lens array 87. Also, a prism 84 is further provided between the DOE scrolling unit 83 and the optical splitter 85.

In the operation of the projection system having such a structure, first, light beams emitted from the light source 81 passes through the DOE scrolling unit 83 and are then made incident upon the optical splitter 85 via the prism 84. As the DOE scrolling unit 83 rotates at a uniform speed, color bars formed on the light valve 90 are scrolled so that color images are formed. For example, the optical splitter 85 can be constituted of first, second, and third dichroic filters 85a, 85b, and 85c that are parallel to one another. The light beams passed through the DOE scrolling unit 83 travel along different paths while passing through the individual cells 83a and are reflected at different locations on the first, second, and third dichroic filters 85a, 85b, and 85c. Thereafter, the light beams reflected by the first, second, and third dichroic filters 85a, 85b, and 85c are focused on different areas of the light valve 90 according to a color by the first and second fly eye lens arrays 87 and 88 and the lens group 89, thereby forming color bars.

Although the optical splitter 85 has the first, second, and third dichroic filters 85a, 85b, and 85c that are parallel to one another, the dichroic filters can be disposed at different angles as shown in FIG. 9. If the dichroic filters 85a, 85b, and 85c are disposed at different angles, it is preferable that the DOE scrolling unit 83 is installed behind the optical splitter 85.

Because the projection systems according to the fourth and fifth embodiments adopt a DOE or HOE scrolling unit, their manufacturing costs are reduced.

In order to synchronize the operating frequency of the DOE scrolling unit 82 or 83 with that of the light valve 90, either the number of lens cells 82a or 83a on the DOE scrolling unit 82 or 83 is changed or the rotation speed of the DOE scrolling unit 82 or 83 is controlled. If the operating frequency of the light valve 90 increases, more lens cells are included without changing the rotation speed of the DOE scrolling unit 82 or 83 so that the scrolling speed of the scrolling unit can increase. Alternatively, the DOE scrolling unit 82 or 83 can be synchronized with the operating frequency of the light valve 90 by increasing the rotation speed of the scrolling unit without changing the number of lens cells on the scrolling unit.

The DOE scrolling unit 82 used in the fourth embodiment is designed so as to achieve both color separation and light scrolling. However, in the fifth embodiment, the DOE scrolling unit 83 is designed so as to achieve only light scrolling, while light separation is achieved by the optical splitter 85.

The grating theory for a single color beam will be first described before the light separation by the DOE scrolling unit 82 is described.

Figure 16A:
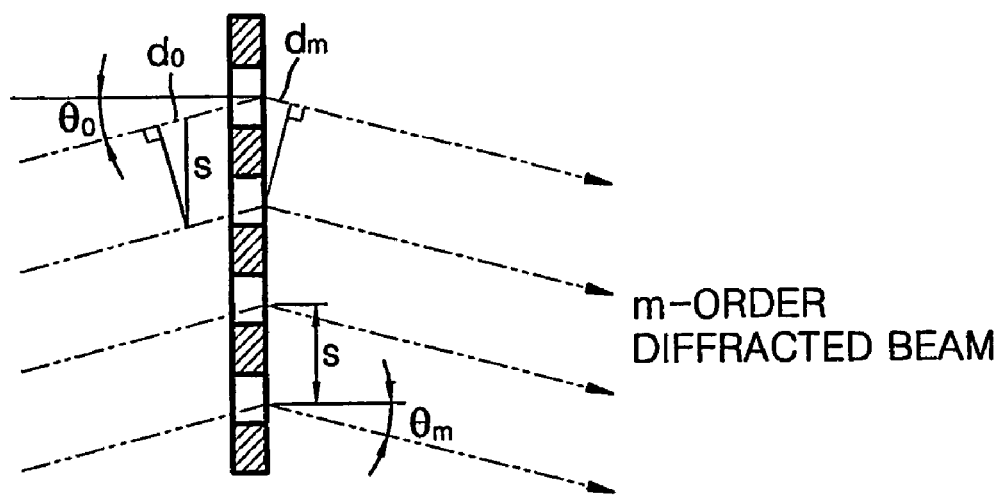
FIGS. 16A and 16B illustrate diffraction performed by the diffractive optical element (DOE) scrolling unit adopted in the projection system according to the fourth embodiment of the present invention.

Referring to FIG. 16A, gratings are formed at predetermined intervals s, and an interference pattern due to an optical path difference (OPD) of an m-th order diffracted beam passed through the gratings is formed. If the OPD of the m-th order diffracted beam satisfies Equation 10, a bright image is observed. Equation 10 is as follows:

$$OPD = d_o + d_m \qquad (10)$$
$$= s\sin\theta_o + s\sin\theta_m$$
$$= m\lambda (m = 0, \pm 1, \pm 2, \ldots)$$

wherein $d_o$ denotes an OPD of an incident beam, $d_m$ denotes an OPD of a diffraction beam, $\theta_o$ denotes an incidence angle of a beam, $\theta_m$ denotes a diffraction angle of a beam, m denotes the diffraction order of a diffracted beam, s denotes a grating interval, and $\lambda$ denotes the wavelength of the incident beam. When parallel beams are incident upon gratings, $\theta_o$ in Equation 10 is 0. Accordingly, Equation 11 is obtained as follows:

$$s\sin\theta_m = m\lambda (m = 0, \pm 1, \pm 2, \ldots) \quad (11)$$

$$s = m\frac{\lambda}{\sin\theta_m}$$

Figure 16B:
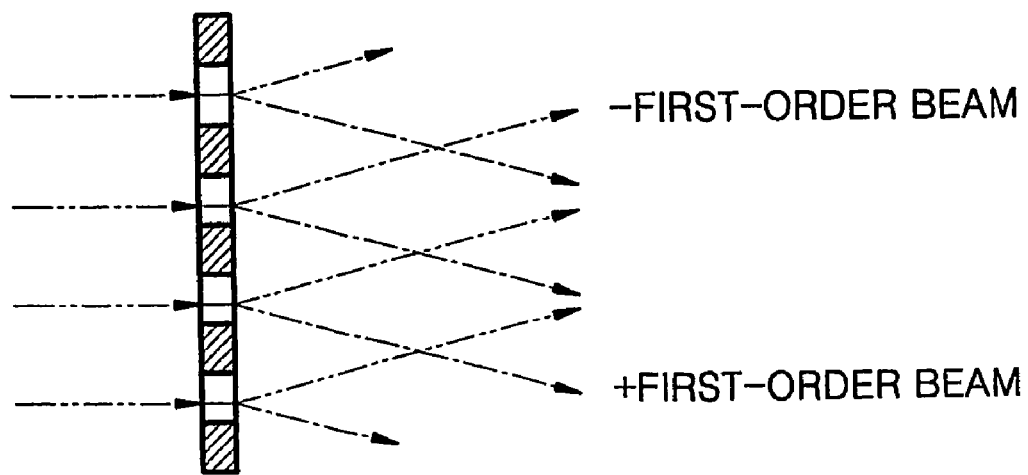

The light paths of ±first order beams among parallel incident beams are shown in FIG. 16B. If the diffraction angle $\theta_m$ in Equation 11 is significantly small, an approximate formula of $\sin\theta_m \approx \theta_m$ can be obtained. Accordingly, the grating interval s can be obtained using Equation 12:

$$s = m\frac{\lambda}{\theta_m} \quad (12)$$

Figure 17:
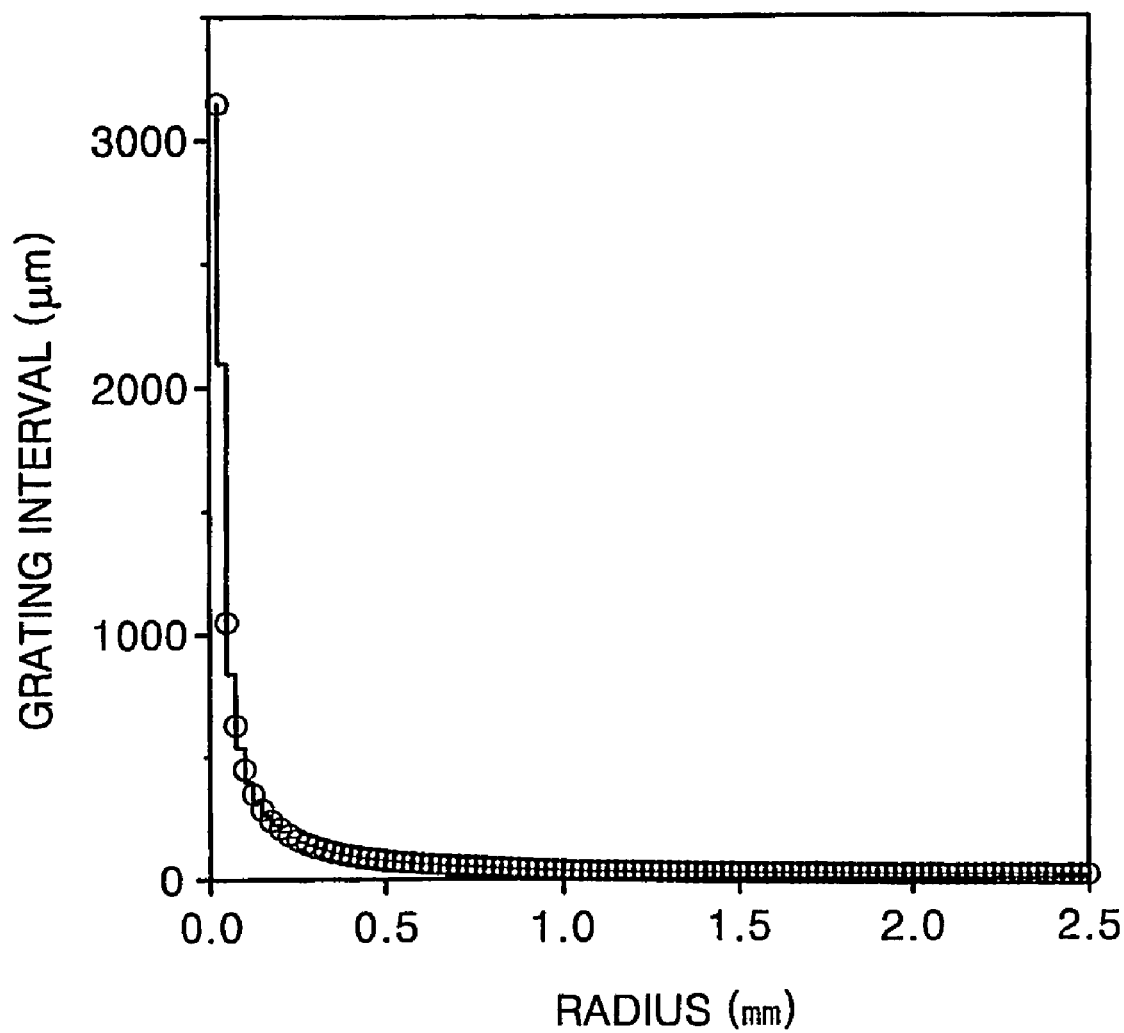
FIG. 17 is a graph showing variations in the grating interval with respect to the radius of a grating.
Figure 18:
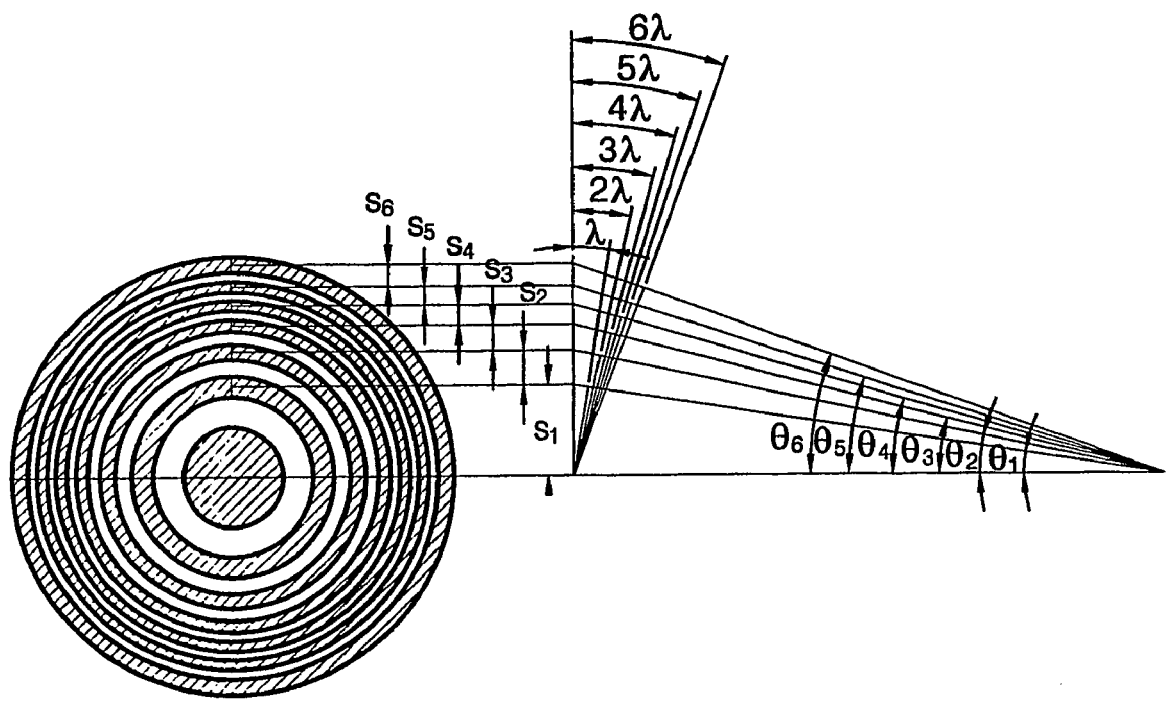
FIG. 18 illustrates beam convergence by a zone panel.

According to Equation 12, when the wavelength of an incident beam is fixed, a desired diffraction angle $\theta_m$ can be obtained by controlling the grating interval s. Meanwhile, variations in the grating interval s according to the radius of a DOE disk designed to respond to a green color are shown in FIG. 17. It can be seen from the graph of FIG. 13 that the grating interval is inversely proportional to the radius of the DOE-type disk. Based on this theory, a zone panel with circular gratings as shown in FIG. 18 can be manufactured. When going from the inner circumference of the zone panel to the outer circumference of the zone panel, the grating interval decreases like $s_1 > s_2 > s_3 > s_4 > s_5 > s_6$. With the decrease in the grating interval, the diffraction angle increases like $\theta_1 < \theta_2 < \theta_3 < \theta_4 < \theta_5 < \theta_6$. Hence, beams passed through the zone panel converge at a point.

Based on this diffraction theory, a DOE scrolling unit according to an embodiment of the present invention is manufactured.

Figure 19A:
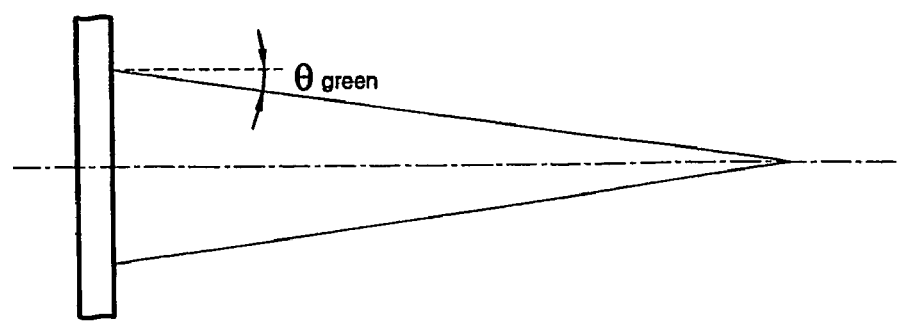
FIGS. 19A through 19C illustrate a process for manufacturing a DOE scrolling unit used in the projection system according to the fourth embodiment of the present invention.

Referring to FIG. 19A, as to a DOE designed to respond to a green color, when a diffraction angle of ±first order diffracted beams, $\theta_{green}$, is 2.2° and a wavelength thereof, $\lambda_{green}$, is 587 nm, the minimum grating interval $s_{green}$ of the green-color DOE calculated using Equation $s_{green} = \lambda/\theta_{green}$ is 15 µm. For example, the grating groove depth is 1 wave (1 $\lambda_{green}$), that is, 587 nm.

Figure 19B:
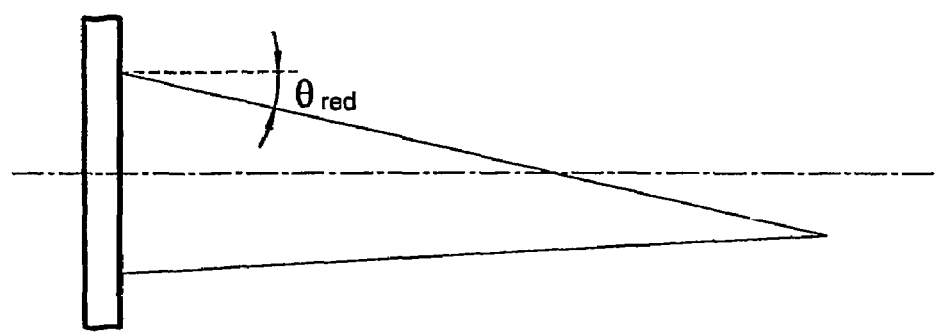
Figure 19C:
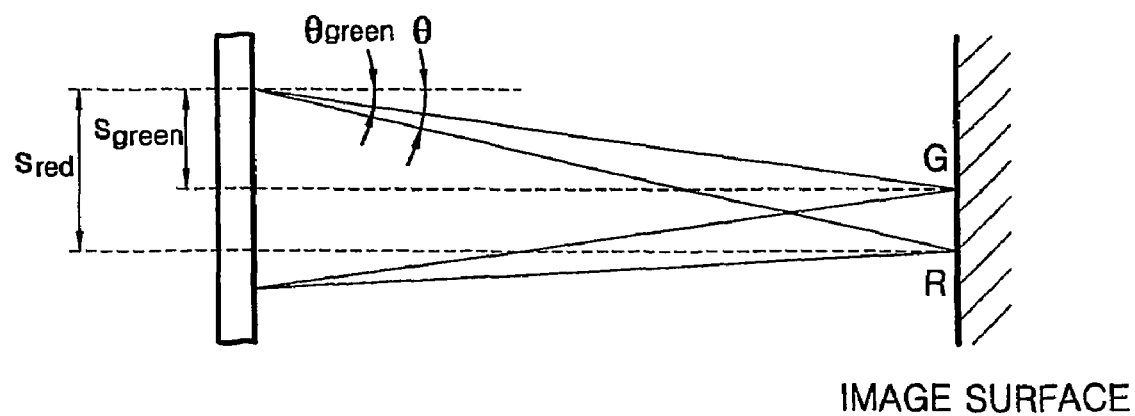

Referring to FIG. 19B, as to a DOE designed to respond to a red color, when a diffraction angle of ±first order diffracted beams, $\theta_{red}$, is 3.7° and a wavelength thereof, $\lambda_{red}$, is 670 nm, the minimum grating interval $s_{red}$ of the red-color DOE calculated using Equation $s_{red} = \lambda/\theta_{red}$ is 10.4 µm. For example, the grating groove depth is 1 $\lambda_{red}$, that is, 670 nm.

A single DOE is formed using the design conditions of the green-color and red-color DOEs shown in FIGS. 19A and 19B, respectively, so that the single DOE can separate incident light into a green color beam and a red color beam. For example, as shown in FIG. 15C, a single DOE has gratings spaced at the green-color grating interval $s_{green}$ and gratings spaced at the red-color grating interval $s_{red}$. An incident beam is separated into a red beam and a green beam by the DOE having the above-described structure, and then the green and red beams are focused on different locations over an imaging surface. Although only the green and red color grating intervals have been described, a blue-color grating interval can be calculated in the same manner. In other words, the green, red, and blue grating intervals $s_{green}$, $s_{red}$, and $s_{blue}$ can be calculated from the green, red, and blue wavelengths $\lambda_{green}$, $\lambda_{red}$, and $\lambda_{blue}$ and the diffraction angles of green, red, and blue color beams, $\theta_{green}$, $\theta_{red}$, and $\theta_{blue}$, respectively, using Equation 13:

$$s_{green} = m\frac{\lambda_{green}}{\theta_{green}} \quad (13)$$

$$s_{red} = m\frac{\lambda_{red}}{\theta_{red}}$$

$$s_{blue} = m\frac{\lambda_{blue}}{\theta_{blue}}$$

A single DOE utilizes the green, red, and blue grating intervals $s_{green}$, $s_{red}$, and $s_{blue}$ in order to separate white light into R, G, and B light beams and focus the three light beams on different locations over an imaging surface. Accordingly, light separation is achieved using the DOE, and scrolling is also achieved by a scrolling unit formed by spiraling the DOE.

Figure 20:
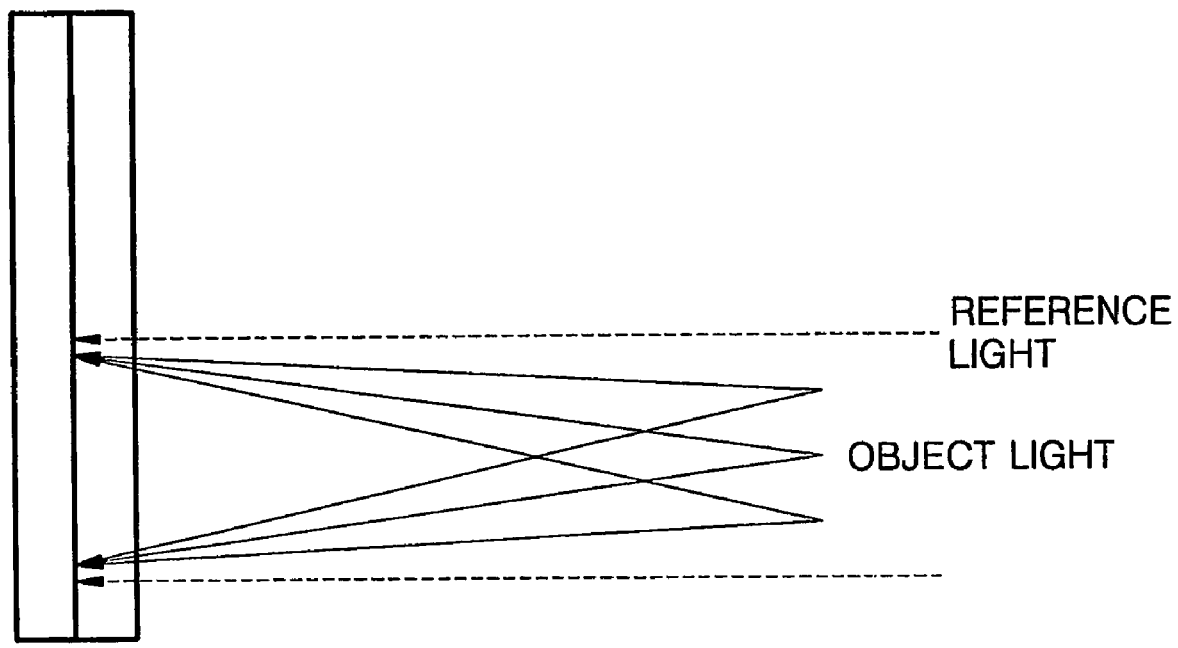
FIG. 20 illustrates the manufacture of a scrolling unit of a volume hologram type.

A scrolling unit according to the present invention can be manufactured using an HOE instead of a DOE. In order to manufacture an HOE-type scrolling unit, as shown in FIG. 20, object light and reference light are projected onto a spiral dry panel so as to form an interference pattern. Here, R, G, and B beams serving as the object light are incident upon the dry panel at different angles. This hologram is called as a volume hologram, and a thin hologram can be used as a hologram for the HOE.

A DOE-type scrolling unit can be manufactured in many different ways. Accordingly, examples of the DOE scrolling unit are a continuous relief lens disk having a continuous quadrative blaze profile as shown in FIG. 21A, a diffractive fresnel lens disk having the continuous quadrative blaze profile, a multi-order diffractive (MOD) lens disk as shown in FIG. 21B, and a deep blazed surface lens disk. The MOD lens disk has fewer grooves, but they are deeper than the grooves of a continuous relief lens disk. Thus, MOD lens disks are easily manufactured and provide higher diffraction efficiency. The diffraction efficiency will be described later with reference to FIG. 22.

Figure 21C:
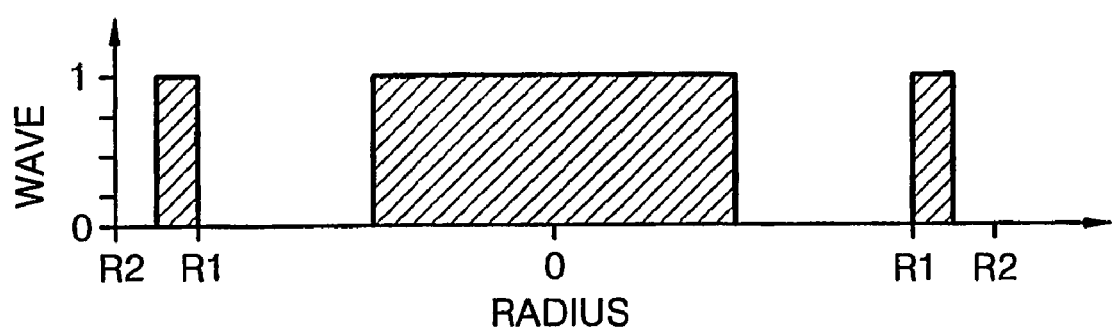
FIG. 21C is a structure view of a binary-type DOE scrolling unit.
Figure 21D:
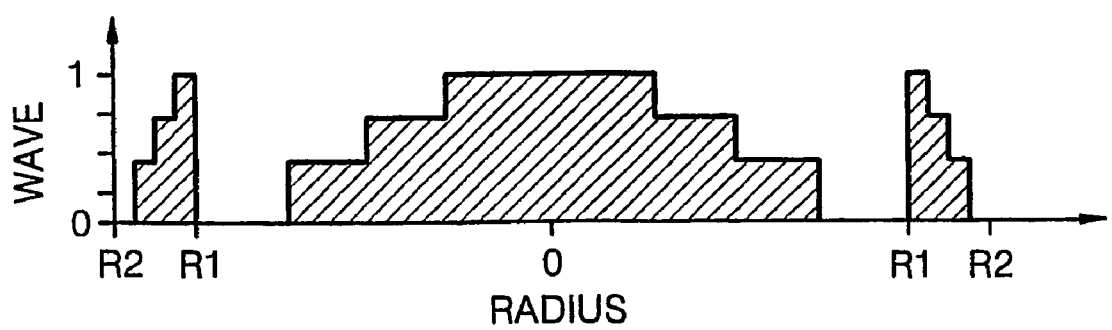
FIG. 21D is a structure view of a multi-step typed DOE scrolling unit.

A binary DOE scrolling unit and a multi-step DOE scrolling unit are shown as examples of DOC scrolling unit in FIGS. 21C and 21D, respectively. A multi-step lens disk has a step profile, but the multi-step lens disk of FIG. 17D has a three-step profile. In particular, the diffraction efficiency increases with an increase in the number of steps. In addition, a refractive fresnel lens disk (not shown) can be an example of a DOE scrolling unit according to the present invention.

Figure 22:
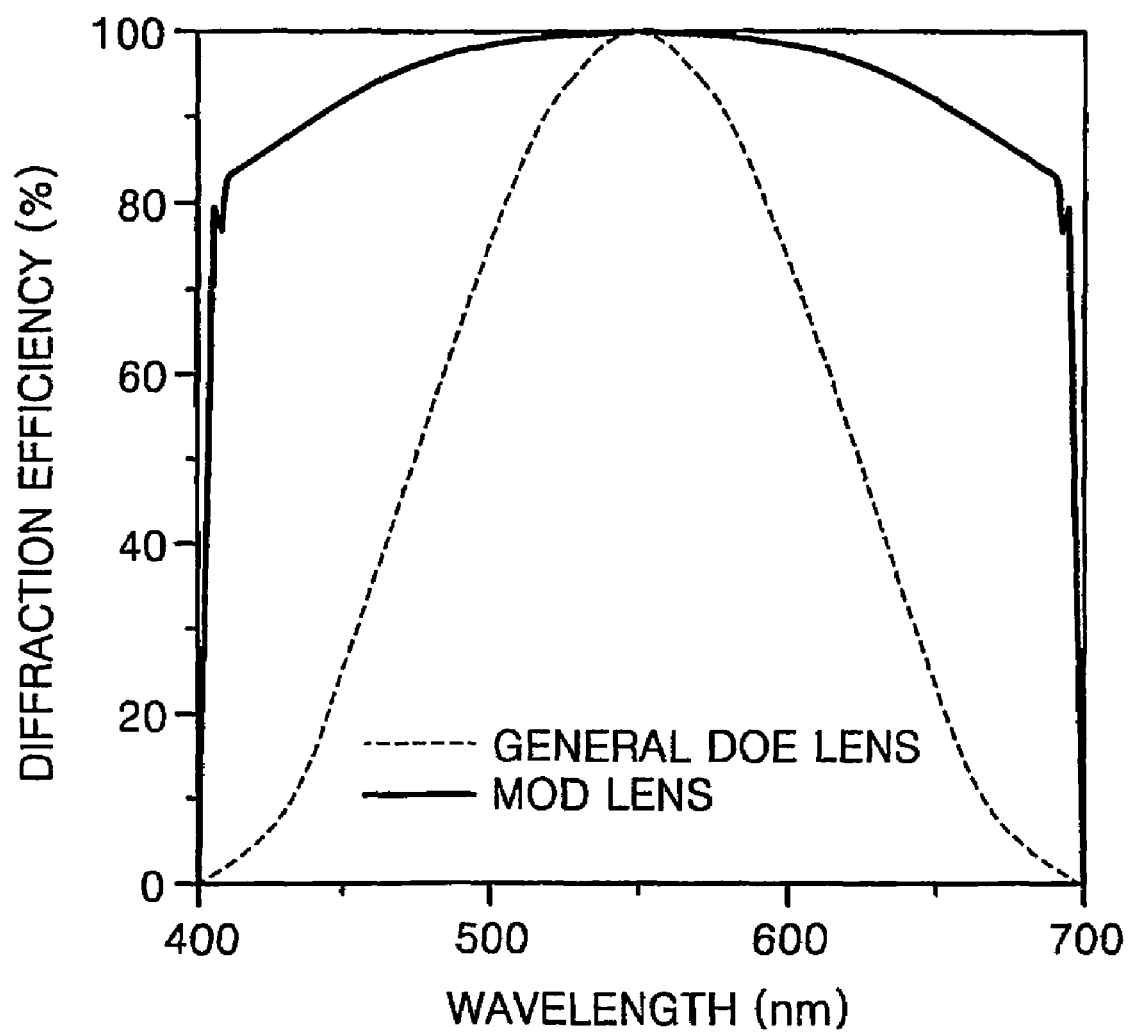
FIG. 22 is a graph showing a diffraction efficiency of a general DOE lens and a diffraction efficiency of an MOD lens with respect to a wavelength.

FIG. 22 is a graph showing a simulation result of the diffraction efficiency of a general DOE lens and the diffraction efficiency of an MOD lens. According to the simulation result shown in FIG. 18, the diffraction efficiency of the MOD lens is almost uniformly high in a wide wavelength zone in contrast to a general DOE lens. Hence, due to the use of a scrolling unit adopting the MOD lens, highly efficient diffracted light can be used in a wide wavelength zone, and furthermore the diffraction efficiency is evenly distributed within the entire visible light band. Consequently, the quality of a color image is improved.

In the second through fifth embodiments, at least one reflection unit is installed on a light source, such that the etendue of the light source is reduced.

INDUSTRIAL APPLICABILITY

As described above, a projection system according to the present invention increases light efficiency by reducing the etendue of a light source. Thus, the entire system can be easily manufactured. To be more specific, in a projection system which forms color images using a scrolling method, if an existing projection lens whose F number is 3.0 is used without change, light efficiency is about 1.5 times higher than that in existing single-panel optical systems. If a projection system whose F number is 2.5 is used, light efficiency is approximately doubled. As described above, if the F number of a projection lens is reduced, higher light efficiency can be expected.

Hence, since the projection system according to the present invention has higher light efficiency than existing single-panel optical systems and a more compact structure than 3-panel optical systems, the competitiveness can be improved.

Also, scrolling with respect to all colors can be performed using a single scrolling unit by converting the rotation of the scrolling unit into a rectilinear motion of a lens array through which light passes. Thus, the scrolling is easily controlled, the number of components is reduced, and a light, low-price projection system can be obtained. The scrolling unit can have the shape of a disk or a cylinder. The scrolling unit can be entirely transformed into any shape in which the rotation of the scrolling unit can be converted into a rectilinear motion of a lens array through which light passes. In addition, when a scrolling unit is manufactured using a DOE or MOD lens, it can be mass-produced at a low cost. Since both light separation and scrolling can be achieved by a single scrolling unit, a projection system using the scrolling unit can be simply assembled. Also, since the scrolling unit provides improved performance because of a reduction in the manufacturing errors, a projection system employing the spiral disk provides good quality images.

Since a conventional single-panel projection system produces color images by sequentially separating white light into R, G, and B light beams, the efficiency of light to be used by a light valve is degraded to ⅓ of the light efficiency of a three-panel projection system. However, a single-panel projection system adopting a scrolling technique according to the present invention separates white light into R, G, and B beams at one time and scrolls the three color beams to form a color image. Therefore, the single-panel projection system according to the present invention can obtain the same light efficiency as the light efficiency of a three-panel projection system.

What is claimed is:

1. A scrolling unit for scrolling incident unit, the scrolling unit comprising:
   a rotation axis; and
   at least one lens cell having an incident side and an emitting side, dividing incident light into light beams of individual lens cells, and making the rotation of the scrolling unit cause a rectilinear motion of the light beams,
   wherein the at least one lens cell is formed of any of a diffractive optical element and a hologram optical element such that incident light is divided according to color.

2. The scrolling unit of claim 1, wherein the rectilinear motion of the light beams is made in the direction where the light beams become closer to or farther from the rotation axis.

3. The scrolling unit of claim 1, wherein the rotation of the scrolling unit causes the rectilinear motion of the light beams to be periodically repeated.

4. The scrolling unit of claim 1, wherein the lens cells are spirally arranged.

5. The scrolling unit of claim 4, wherein the scrolling unit has a shape of a disk.

6. The scrolling unit of claim 4, wherein the lens cells are cylindrical lenses.

7. A scrolling unit having at least one lens cell and scrolling incident light in such a way that, from the viewpoint of light incident upon the at least one lens cell, the rotation of the at least one lens cell is converted into a rectilinear motion of a lens array,
   wherein the at least one lens cell is formed of any of a diffractive optical clement and a hologram optical element such that incident light is divided according to color.

8. The scrolling unit of claim 7, wherein the lens cells are spirally arranged.

9. The scrolling unit of claim 8, wherein the lens cells are cylindrical lenses.

10. The scrolling unit of claim 7, wherein the scrolling unit has a shape of a disk.

11. The scrolling unit of claim 7, wherein the lens cells are arranged so that, when a normal line is drawn to the lens cells, the interval between adjacent lens cells is uniform, and the normal vectors of adjacent lens cells are the same.

12. A scrolling unit having at least one lens cell and scrolling incident light in such a way that, from the viewpoint of light incident upon the at least one lens cell, the rotation of the at least one lens cell is converted into a rectilinear motion of a lens array,
   wherein the lens cells are arranged so that, when a normal line is drawn to the lens cells, the interval between adjacent lens cells is uniform, and the normal vectors of adjacent lens cells are the same,
   wherein a spiral track $(Q_{kx}, Q_{ky})$ of each of the lens cells satisfies the following Equation:

$$Q_{kx} = Q_{1,x} \cos(k-1)\theta_2 - Q_{1,y} \sin(k-1)\theta_2$$

$$Q_{ky} = Q_{1,y} \sin(k-1)\theta_2 - Q_{1,y} \cos(k-1)\theta_2$$

wherein $Q_{1,x}$ and $Q_{1,y}$ denote the x and y coordinates of a first cylinder lens cell, respectively, k denotes a natural number, and $\theta_2$ denotes a rotation angle between adjacent curves.

13. A scrolling unit having at least one lens cell and scrolling incident light in such a way that, from the viewpoint of light incident upon the at least one lens cell, the rotation of the at least one lens cell is converted into a rectilinear motion of a lens array,
   wherein the cross-section of the scrolling unit is an array of arcs having the same radius.

14. The scrolling unit of claim 13, wherein each of the lens cells is formed of any of a binary lens, a continuous relief lens, a multi-step lens, a multi-order refractive lens, a thin hologram lens, and a volume hologram lens.

15. A projection system comprising:
   a light source;
   an optical splitter for splitting light emitted from the light source according to wavelength;
   at least one scrolling unit having at least one lens cell and scrolling incident light in such a way that it appears to light transmitted by the lens cell that the rotation of the lens cell is converted into a rectilinear motion of a lens array, wherein the at least one lens cell is formed of any of a diffractive optical element and a hologram optical element; and a light valve on which the light emitted from the light source is separated into color beams by the optical splitter and the scrolling unit and on which the color beams are focused, the light valve processing incident light according to an input image signal in order to form a color image.

16. The projection system of claim 15, wherein the lens cells are spirally arranged.

17. The projection system of claim 16, wherein the lens cells are cylindrical lenses.

18. The projection system of claim 15, wherein the scrolling unit has a shape of a disk.

19. A projection system comprising:
a light source:
an optical splitter for splitting light emitted from the light source according to wavelength;
at least one scrolling unit having at least one lens cell and scrolling incident light in such a way that it appears to light transmitted by the lens cell that the rotation of the lens cell is converted into a rectilinear motion of a lens array; and
a light valve on which the light emitted from the light source is separated into color beams by the optical splitter and the scrolling unit and on which the color beams are focused, the light valve processing incident light according to an input image signal in order to form a color image,
wherein at least one fly eye lens array is installed on a light path between the scrolling unit and the light valve.

20. The projection system of claim 19, wherein a relay lens for focusing the light transmitted by the at least one fly eye lens array on the light valve is included.

21. The projection system of claim 15, wherein the optical splitter includes first through third dichroic filters adjacently disposed at different angles to selectively transmit or reflect the incident light according to wavelength, and the scrolling unit is installed behind the optical splitter.

22. The projection system of claim 15, wherein the optical splitter includes first through third dichroic filters disposed in parallel to selectively transmit or reflect the incident light according to wavelength, and the scrolling unit is installed before the optical splitter.

23. The projection system of claim 22, further comprising a prism before the optical splitter.

24. A projection system comprising:
a light source;
an optical splitter for splitting light emitted from the light source according to wavelength;
at least one scrolling unit having at least one lens cell and scrolling incident light in such a way that it appears to light transmitted by the lens cell that the rotation of the lens cell is converted into a rectilinear motion of a lens array; and
a light valve on which the light emitted from the light source is separated into color beams by the optical splitter and the scrolling unit and on which the color beams are focused, the light valve processing incident light according to an input image signal in order to form a color image,
wherein a first cylinder lens is installed before the at least one scrolling unit, and a second cylinder lens paired with the first cylinder lens is installed behind the scrolling unit, in order to control the width of an incident beam.

25. The projection system of claim 20, wherein a first cylinder lens is installed before the at least one scrolling unit, and a second cylinder lens paired with the first cylinder lens is installed behind the scrolling unit, in order to control the width of an incident beam.

26. A projection system comprising:
a light source;
an optical splitter for splitting light emitted from the light source according to wavelength;
at least one scrolling unit having at least one lens cell and scrolling incident light in such a way that it appears to light transmitted by the lens cell that the rotation of the lens cell is converted into a rectilinear motion of a lens array; and
a light valve on which the light emitted from the light source is separated into color beams by the optical splitter and the scrolling unit and on which the color beams are focused, the light valve processing incident light according to an input image signal in order to form a color image,
wherein the lens cells are arranged so that, when a normal line is drawn to the lens cells, the interval between adjacent lens cells is uniform, and the normal vectors of adjacent lens cells are the same.

27. The projection system of claim 26, wherein a spiral track $(Q_{kx}, Q_{ky})$ of the lens cell satisfies the following Equation:

$$Q_{kx} = Q_{1,x} \cos(k-1)\theta_2 - Q_{1,y} \sin(k-1)\theta_2$$

$$Q_{ky} = Q_{1,y} \sin(k-1)\theta_2 - Q_{1,y} \cos(k-1)\theta_2$$

wherein $Q_{1,x}$ and $Q_{1,y}$ denote the x and y coordinates of the first cylinder lens cell, respectively, k denotes a natural number, and $\theta_2$ denotes a rotation angle between adjacent curves.

28. A projection system comprising:
a light source;
an optical splitter for splitting light emitted from the light source according to wavelength;
at least one scrolling unit having at least one lens cell and scrolling incident light in such a way that it appears to light transmitted by the lens cell that the rotation of the lens cell is converted into a rectilinear motion of a lens array; and
a light valve on which the light emitted from the light source is separated into color beams by the optical splitter and the scrolling unit and on which the color beams are focused, the light valve processing incident light according to an input image signal in order to form a color image,
wherein the cross-section of the scrolling unit is an array of arcs having the same radius.

29. A projection system comprising:
a light source;
an optical splitter for splitting light emitted from the light source according to wavelength;
at least one scrolling unit having at least one lens cell and scrolling incident light in such a way that it appears to light transmitted by the lens cell that the rotation of the lens cell is converted into a rectilinear motion of a lens array,
wherein the at least one lens cell is formed of any of a diffractive optical element and a hologram optical element; and
a light valve on which the light emitted from the light source is separated into color beams by the optical splitter and the scrolling unit and on which the color beams are focused, the light valve processing incident light according to an input image signal in order to form a color image, wherein the lens cell is formed of any of a binary lens, a continuous relief lens, a multi-step lens, a multi-order refractive lens, a thin hologram lens, and a volume hologram lens.

30. The projection system of claim 15, wherein the number of lens cells on the at least one scrolling unit is determined so that the scrolling unit can operate in synchronization with the operating frequency of the light valve.

31. The projection system of claim 15, wherein the rotation frequency of the scrolling unit is controlled so as to be synchronized with the operating frequency of the light valve.

* * * * *